United States Patent
Nobayashi

(10) Patent No.: US 10,948,281 B2
(45) Date of Patent: Mar. 16, 2021

(54) DISTANCE INFORMATION PROCESSING APPARATUS, IMAGING APPARATUS, DISTANCE INFORMATION PROCESSING METHOD AND PROGRAM

(71) Applicant: CANON KABUSHIKI KAISHA, Tokyo (JP)

(72) Inventor: Kazuya Nobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/294,128

(22) Filed: Mar. 6, 2019

(65) Prior Publication Data

US 2019/0204073 A1 Jul. 4, 2019

Related U.S. Application Data

(62) Division of application No. 15/063,864, filed on Mar. 8, 2016, now Pat. No. 10,267,623.

(30) Foreign Application Priority Data

Mar. 17, 2015 (JP) ................................. 2015-053886

(51) Int. Cl.
*G01B 11/14* (2006.01)
*H04N 5/232* (2006.01)
(Continued)

(52) U.S. Cl.
CPC .............. *G01B 11/14* (2013.01); *G06T 5/002* (2013.01); *G06T 5/006* (2013.01); *G06T 5/50* (2013.01); *H04N 5/2256* (2013.01); *H04N 5/23212* (2013.01); *H04N 5/232122* (2018.08); *G06T 2207/10016* (2013.01); *G06T 2207/10028* (2013.01)

(58) Field of Classification Search
None
See application file for complete search history.

(56) References Cited

U.S. PATENT DOCUMENTS 4,965,840 A 10/1990 Subbarao
10,070,038 B2 9/2018 Komatsu
(Continued)

FOREIGN PATENT DOCUMENTS

EP 0 318 188 A2 5/1989
JP 2756803 B2 5/1998
(Continued)

*Primary Examiner* — Talha M Nawaz
(74) *Attorney, Agent, or Firm* — Venable LLP

(57) ABSTRACT

A distance information processing apparatus includes a memory and a processor that function as an acquirer configured to acquire a distance image signal constituted by a plurality of distances to an object in a depth direction in regions of an image signal. The memory and processor also function as a determiner configured to determine positional confidence of the distances for the regions of the image signal based on differences among a plurality of positions in an in-plane direction perpendicular to the depth direction, the plurality of positions respectively corresponding to the plurality of distance in the depth direction. The determiner is further configured to determine the positional confidence based on an image SN ratio of the image signal.

29 Claims, 12 Drawing Sheets

(51) Int. Cl.
*G06T 5/00* (2006.01)
*H04N 5/225* (2006.01)
*G06T 5/50* (2006.01)

(56) References Cited

U.S. PATENT DOCUMENTS

| | | |
|---|---|---|
| 2008/0159628 A1* | 7/2008 | Yoshida ............... H04N 5/232 382/190 |
| 2011/0025827 A1 | 2/2011 | Shpunt et al. |
| 2013/0156339 A1 | 6/2013 | Hayata et al. |
| 2014/0063234 A1 | 3/2014 | Nobayashi |
| 2014/0152776 A1 | 6/2014 | Cohen et al. |
| 2014/0210999 A1 | 7/2014 | Komatsu |
| 2015/0005575 A1 | 1/2015 | Kobayashi et al. |
| 2015/0062302 A1 | 3/2015 | Uchiyama et al. |
| 2015/0097991 A1 | 4/2015 | Nobayashi |
| 2015/0103163 A1 | 4/2015 | Won et al. |
| 2015/0201121 A1 | 7/2015 | Nobayashi |
| 2015/0207999 A1 | 7/2015 | Han |
| 2015/0241205 A1 | 8/2015 | Nobayashi |
| 2016/0088185 A1* | 3/2016 | Nagasaka ............ H04N 1/3871 358/1.2 |
| 2016/0146591 A1* | 5/2016 | Denda .................. G01S 7/4808 702/150 |
| 2016/0171706 A1 | 6/2016 | Somanath |
| 2016/0273909 A1* | 9/2016 | Nobayashi ........... H04N 5/2256 |

FOREIGN PATENT DOCUMENTS

| | | |
|---|---|---|
| JP | 2008-065634 A | 3/2008 |
| JP | 2009-162747 A | 7/2009 |
| JP | 4537597 B2 | 9/2010 |
| JP | 2011-232544 A | 11/2011 |
| JP | 4915126 B2 | 4/2012 |
| JP | 2014-137482 A | 7/2014 |
| JP | 2014-145725 A | 8/2014 |

* cited by examiner

DISTANCE INFORMATION PROCESSING APPARATUS, IMAGING APPARATUS, DISTANCE INFORMATION PROCESSING METHOD AND PROGRAM

This application is a division of application Ser. No. 15/063,864 filed Mar. 8, 2016.

BACKGROUND OF THE INVENTION

Field of the Invention

The present invention relates to a distance information processing apparatus, an imaging apparatus, a distance information processing method and a program.

Description of the Related Art

In an imaging apparatus, such as a digital still camera and a digital video camera, an imaging apparatus having a ranging function has been proposed, where a distance from the imaging apparatus to an object (object distance) can be acquired at a plurality of pixel positions at the same time with acquiring an ornamental image signal (an image signal constituted by object distances acquired at a plurality of pixel positions is hereafter called "distance image signal").

For example, Japanese Patent No. 4915126 discloses a solid-state imaging element where a pixel, having a ranging function, is disposed in a part of or in all of the pixels of the imaging element, and the object distance is detected by the phase difference method. The ranging method disclosed in Japanese Patent No. 4915126 is called "imaging plane phase difference ranging method", since phase difference type ranging is performed on the imaging plane. If the solid-state imaging element according to Japanese Patent No. 4915126 is used, at least two image signals can be acquired based on the images generated by luminous flux which passed through different pupil regions within an imaging optical system of the imaging apparatus. A relative positional shift amount between the two image signals is detected by a method similar to a parallax detection method using stereo images, and is converted into a defocus amount via a predetermined conversion coefficient, whereby the object distance can be acquired. Further, according to the imaging plane phase difference ranging method, an ornamental image signal can be generated by combining two image signals. Another ranging method, referred to as the depth from defocus (DFD) method, is disclosed in Japanese Patent No. 2756803. The DFD method is a ranging method where two image signals are consecutively acquired in a time series with changing the photographing conditions (e.g. diaphragm stop, focal length), and the object distance is acquired from the difference of blur amounts between the two images. In the DFD method, one of the two image signals can be used as an ornamental image signal.

In the case of the imaging apparatus having the ranging function, the depth of field and focus position can be controlled after an image is acquired by performing image processing on the ornamental image signal based on the distance image signal. Further, a number of individuals can be accurately measured by extracting an individual in a space based on the distance range of the object calculated from the ornamental image signal and distance image signal.

In all these object distance calculation methods, the object distance is calculated based on the correlation of the two image signals. When a correlation is evaluated, normally a region-based matching method is used. In the region-based matching method, an image signal included in a predetermined collation region is extracted from each image signal to evaluate the correction. If correlation of the two images is accurately evaluated, the object distance can be acquired at high precision, but if not, an incorrect object distance may be calculated.

Japanese Patent No. 4537597 discloses a method of separating a region where the correlation is evaluated incorrectly, and a region where the correlation is evaluated correctly. In Japanese Patent No. 4537597, an upper layer matching unit evaluates the correlation among image signals using a predetermined collation region, and a lower layer matching unit evaluates correlation for each divided collation region generated by dividing the collation region. According to the method disclosed in Japanese Patent No. 4537597, it is determined that the correlation is not evaluated correctly when the result of evaluating the correlation in the upper layer and the result of evaluating the correlation in the lower layer do not match.

Patent Document 1: Japanese Patent No. 4915126
Patent Document 2: Japanese Patent No. 2756803
Patent Document 3: Japanese Patent No. 4537597

SUMMARY OF THE INVENTION

There are two types of incorrect evaluation of correlation classified by cause. One type is an incorrect evaluation of correlation caused by an object or photographing conditions. If the contrast of the object changes very little, of if the noise amount included in the image signal is high, the value of the object distance may be incorrectly calculated. A second type is incorrect evaluation of correlation caused when the collation region, used for evaluating the correlation, has a relatively large region size. If a plurality of objects having different distances is included in the collation region, a distance of one of the objects included in the collation region is calculated, but it is not clear which object distance is calculated. In other words, when an object distance of a pixel is calculated, an object distance of a different pixel may be calculated in error. An incorrect detection generated when an object distance of a different pixel (position) is calculated in error is hereafter called "incorrect calculation of the object distance position".

According to the method disclosed in Japanese Patent No. 4537597, whether there is a mismatch between the upper layer matching unit and the lower layer matching unit is determined using a predetermined value. Since an incorrect evaluation of correlation is determined based on whether there is a mismatch, it may be unable to distinguish whether the cause of the incorrect evaluation is an incorrect calculation of the object distance value itself, or an incorrect calculation of the object distance position.

Incorrect calculation of the object distance position is generated primarily in the boundary between an object located at a distance and an object located nearby. Therefore to determine whether the cause of the incorrect evaluation is an incorrect calculation of the object distance itself or an incorrect evaluation of the object distance position, it is determined whether the change (differential) corresponding to the pixel position of which object distance is measured is a threshold or more. In this case, a large threshold must be set if the distance range in the depth direction, where the object exists, is wide. This means that if the threshold is fixed, the region of which correlation was incorrectly evaluated may not be accurately extracted depending on the object distance range. If the region, of which correlation was incorrectly evaluated, cannot be accurately extracted, the distance of the object may be incorrectly calculated.

With the foregoing in view, it is an object of the present invention to accurately determine the distance range in the depth direction where an object exists.

A first aspect of the present invention is a distance information processing apparatus (distance range calculator) having: a distance calculator configured to calculate object distances, which are distances to an object in the depth direction, for a plurality of pixel positions on the basis of a first image signal and a second image signal, so as to calculate a distance image signal constituted by a plurality of object distances; a first confidence calculator configured to calculate a first confidence representing certainty of an object distance value in the distance image signal; and a range calculator configured to calculate a distance range, which is a range of an object distance, on the basis of the distance image signal and the first confidence.

A second aspect of the present invention is the distance information processing apparatus (distance confidence calculation apparatus) further having: the above mentioned distance range calculator; and a second confidence calculator configured to calculate a second confidence representing certainty of a position on a plane orthogonal to the depth direction of the object distance on the basis of the distance range and the object distance.

A third aspect of the present invention is a distance information processing apparatus (distance image signal correction apparatus) further having: the abovementioned distance confidence calculation apparatus; and a corrector configured to calculate a corrected distance image signal by correcting the distance image signal on the basis of the first confidence and the second confidence.

A fourth aspect of the present invention is an imaging apparatus having an imaging unit and the above mentioned distance information processing apparatus (one of: the distance range calculator, the distance confidence calculation apparatus, and the distance image signal correction apparatus).

A fifth aspect of the present invention is an imaging apparatus having: the above mentioned distance range calculator; a light emitting unit; a light imaging unit; and an emission controller configured to calculate light emission control information to control light emission quantity of the light emitting unit on the basis of a distance range calculated by a distance range calculator, and controls the light emitting unit so that light is irradiated according to the light emission control information in synchronization with photographing by the imaging unit.

A sixth aspect of the present invention is an imaging apparatus having: the above mentioned distance range calculator; a light emitting unit; an imaging unit; and a light emission controller configured to calculate emission control information to control light emission quantity distribution of the light emitting unit on the basis of a distance range calculated by the distance range calculator, and control the light emitting unit so that light is irradiated according to the light emission control information in synchronization with photographing by the imaging unit.

A seventh aspect of the present invention is a distance information processing apparatus (distance image quantization apparatus) having: the above mentioned distance range calculator; a storage unit; and a quantizing unit configured to set a maximum value and a minimum value in a quantized distance range based on a distance range calculated by the distance range calculator, set a quantized distance value by dividing a range between the maximum value and the minimum value in the quantized distance range by a predetermined quantization rate, calculate a quantized distance image signal by correlating the object distance constituting the distance image signal with a quantized distance value having a closest value, and store the quantized distance image signal in the storage unit.

According to the present invention, the distance range in the depth direction where an object exists can be accurately determined.

Further features of the present invention will become apparent from the following description of exemplary embodiments with reference to the attached drawings.

DESCRIPTION OF THE EMBODIMENTS

Embodiment 1

Embodiment 1 of the present invention will now be described in detail with reference to the drawings. In the following description, a case of a digital camera will be described as an example of an imaging apparatus having a distance range calculator (distance information processing apparatus) according to this embodiment, but application of the present invention is not limited to this. In the description with reference to the drawings, a same segment is normally denoted with a same reference signal, even if the figure numbers are different, and redundant description is minimized.

The distance range calculator according to the present invention is an apparatus to calculate a range of the distance in the depth direction of an object included in an image (distance range). In this description, "object" refers to all the objects photographed in the range. Therefore the distance range calculator can also be defined as an apparatus configured to calculate the minimum distance and the maximum distance of the objects included in an image.

<Configuration of Digital Camera>

Figure 1A:
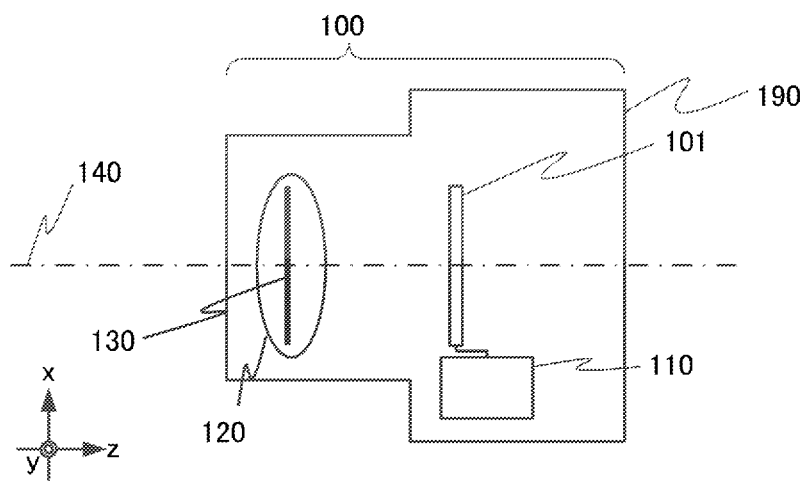
FIG. 1A to FIG. 1C are diagrams depicting an imaging apparatus according to Embodiment 1.

FIG. 1A is a diagram depicting a configuration of a digital camera 100. The digital camera 100 is constituted by an imaging optical system 120, an imaging element 101, a distance range calculator 110, an image generation unit (not illustrated), a lens driving control unit (not illustrated), and an image signal storage unit (not illustrated), which are disposed inside a camera case body 190. The distance range calculator 110 can be constructed using a logic circuit. For another format, the distance range calculator 110 may be constituted by a central processing unit (CPU) and a memory that stores processing programs.

The imaging optical system 120 is a photographing lens of the digital camera 100, and has a function to foil an image of an object on the imaging element 101. The imaging optical system 120 is constituted by a plurality of lens groups (not illustrated), and has an exit pupil 130 at a position distant from the imaging element 101 by a predetermined distance. In this description, it is assumed that the z axis is parallel with the optical axis 140 of the imaging optical system 120. It is also assumed that the x axis and the y axis are orthogonal to each other, and are orthogonal to the optical axis.

<Configuration of Imaging Element>

The imaging element 101 is constituted by a complementary metal-oxide semiconductor (CMOS) or a charge coupled device (CCD), and has a ranging function based on an imaging plane phase difference ranging method. An object image formed on the imaging element 101 via the imaging optical system 120 is photoelectrically-converted by the imaging element 101, and generates an image signal based on the object image. By the image generation unit performing development processing on the acquired image signal, an ornamental image signal can be generated. Further, the generated ornamental image can be stored in the image signal storage unit. The imaging element 101 according to this embodiment will now be described in detail with reference to FIG. 1B.

Figure 1B:
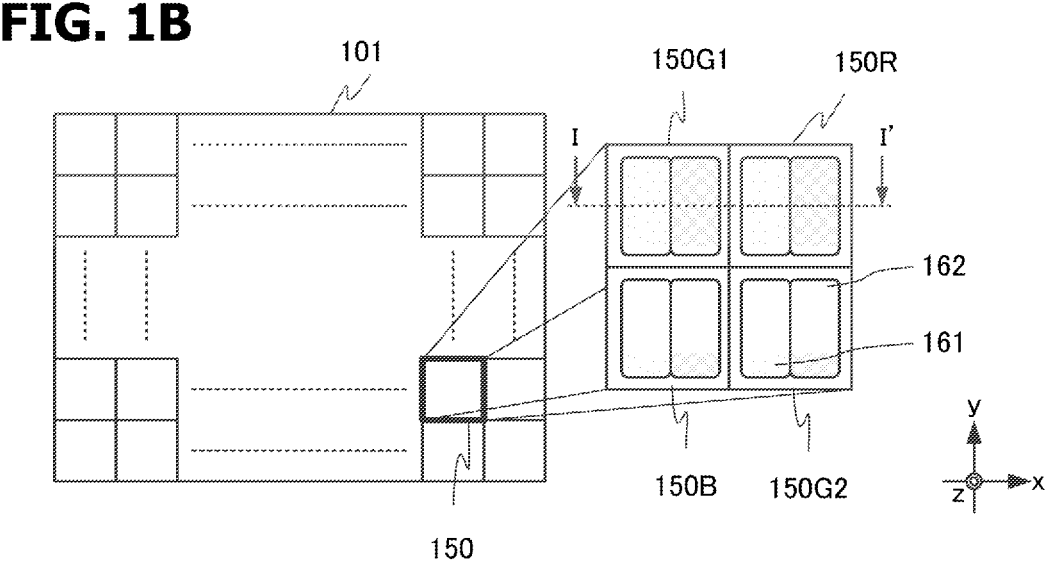

FIG. 1B is an xy cross-sectional view of the imaging element 101. The imaging element 101 is constituted by a plurality of pixel groups 150, where each pixel group consists of two rows×two columns. In each pixel group 150, a green pixel 150G1 and a green pixel 150G2 are disposed diagonally, and a red pixel 150R and a blue pixel 150B are disposed in the other two pixels.

Figure 1C:
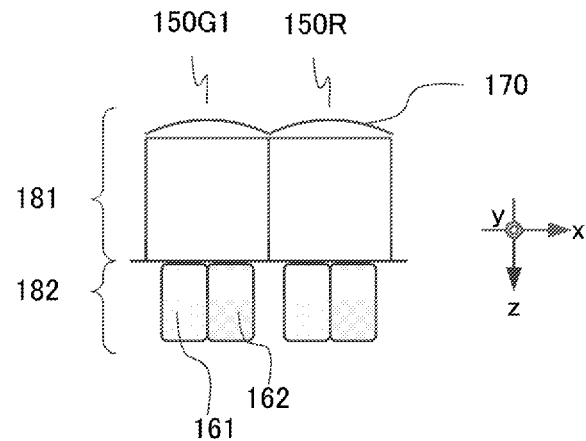

FIG. 1C is a schematic diagram depicting the I-I' cross-section of the pixel group 150. Each pixel is constituted by a light guiding layer 181 and a light receiving layer 182. In the light receiving layer 182, two photoelectric conversion units (first photoelectric conversion unit 161 and second photoelectric conversion unit 162), for photoelectrically-converting the received light, are disposed. In the light guiding layer 181, a micro-lens 170, for efficiently guiding the luminous flux that entered the pixel to the photoelectric conversion unit, a color filter (not illustrated) for allowing light having a predetermined wavelength band to pass, and wiring (not illustrated) for reading the image and driving the pixel, for example, are disposed.

<Description of Distance Measurement Principle of Imaging Plane Phase Difference Ranging Method>

Figure 2A:
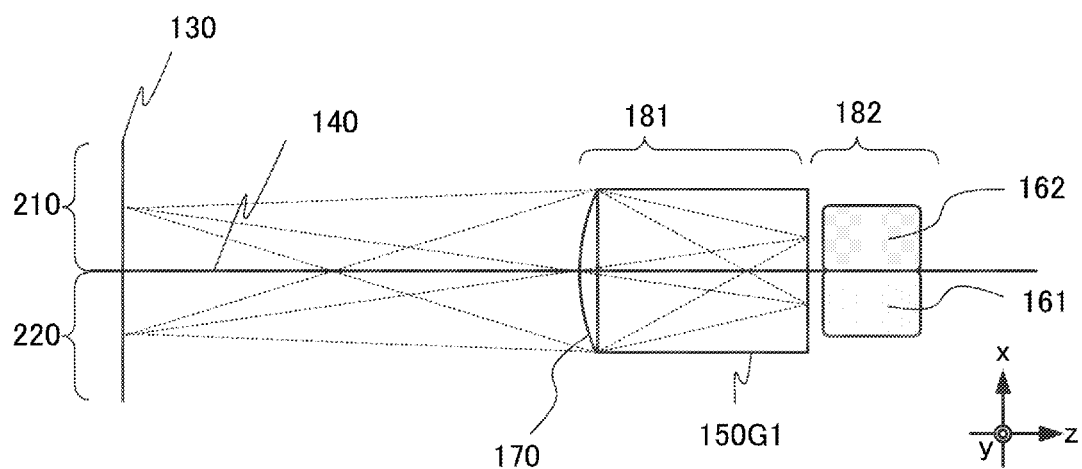
FIG. 2A to FIG. 2D are diagrams depicting a principle of distance measurement.

The luminous flux received by the first photoelectric conversion unit 161 and the second photoelectric conversion unit 162 of the imaging element 101 according to this embodiment will be described with reference to FIG. 2A. FIG. 2A is a schematic diagram depicting the exit pupil 130 of the imaging optical system 120 and only the green pixel 150G1, as a representative example of the pixels disposed in the imaging element 101. The micro-lens 170 in the pixel 150G1 shown in FIG. 2A is disposed so that the exit pupil 130 and the light receiving layer 182 are optically conjugate with each other. As a result, as shown in FIG. 2A, the luminous flux that passed through a first pupil region (210), which is a partial pupil region included in the exit pupil 130, enters the first photoelectric conversion unit 161. In the same manner, the luminous flux that passed through a second pupil region (220), which is a partial pupil region, enters the second photoelectric conversion unit 162.

The first photoelectric conversion unit 161 generates an electric signal by photoelectrically converting the received luminous flux. In the same manner, the second photoelectric conversion unit 162 generates an electric signal by photoelectrically converting the received luminous flux. A set of electric signals generated by the first photoelectric conversion unit 161 of each pixel of the imaging element 101 is called "first image signal". In the same manner, a set of electric signals generated by the second photoelectric conversion unit 162 of each pixel of the imaging element 101 is called "second image signal". From the first image signal, an intensity distribution of an image formed by luminous flux, which passed mainly through the first pupil region 210, on the imaging element 101, can be acquired, and from the second signal, an intensity distribution of an image formed by luminous flux, which passed mainly through the second pupil region 220, on the imaging element 101, can be acquired.

Figure 2B:
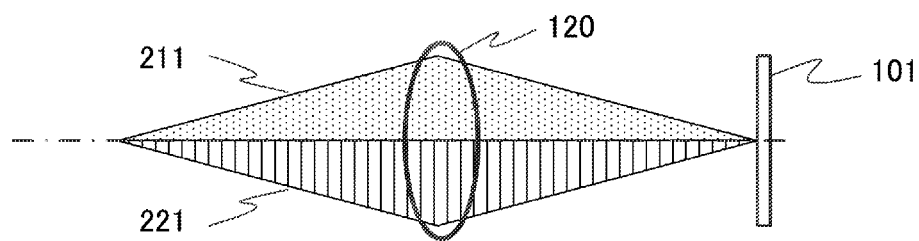
Figure 2C:
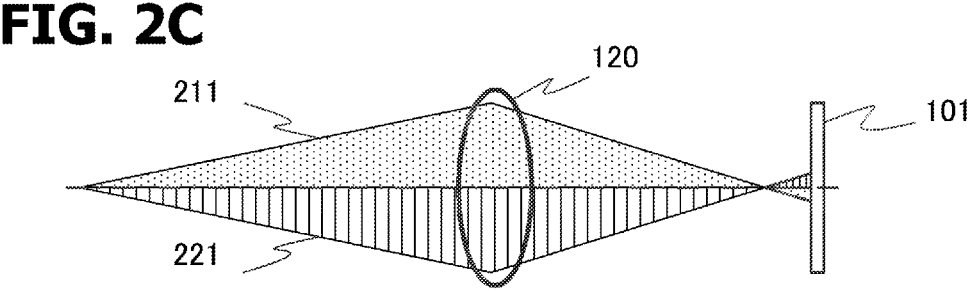
Figure 2D:
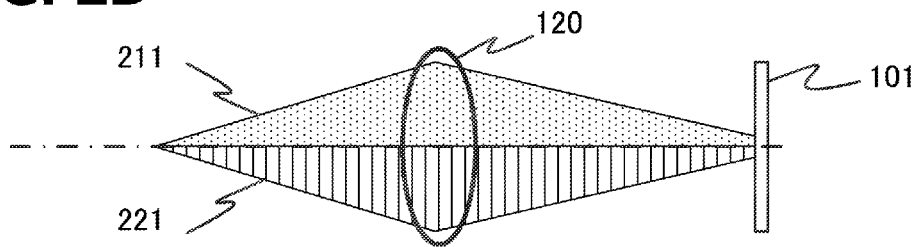

The relative positional shift amount between the first image signal and the second image signal becomes an amount corresponding to the defocus amount. The relationship between the positional shift amount and the defocus amount will now be described with reference to FIGS. 2B, 2C and 2D. FIGS. 2B, 2C and 2D are schematic diagrams depicting the imaging element 101 and the imaging optical system 120 according to this embodiment. The luminous flux 211 indicates the first luminous flux which passed through the first pupil region 210. The luminous flux 221 indicates the luminous flux which passed through the second pupil region 220.

FIG. 2B shows a focused state where the first luminous flux 211 and the second luminous flux 221 are converged on the imaging element 101. In this case, the relative positional shift amount between the first image signal formed by the first luminous flux 211 and the second image signal formed by the second luminous flux 221 is 0. FIG. 2C shows a defocused state where the focal point is shifted in the negative direction of the z axis on the image side. In this case, the relative positional shift amount between the first image signal formed by the first luminous flux 211 and the second image signal formed by the second luminous flux 221 is not 0, but has a negative value. FIG. 2D shows a defocused state where the focal point is shifted in the positive direction of the z axis on the image side. In this case, the relative positional shift amount between the first image signal formed by the first luminous flux 211 and the second image signal formed by the second luminous flux 221 is not zero, but has a positive value.

As the comparison of FIG. 2C and FIG. 2D shows, the direction of the positional shift reverses depending on whether the defocus amount is positive or negative. Further, the positional shift corresponding to the defocus amount is generated based on the geometric relationship. Therefore if the positional shift amount between the first image signal and the second image signal is detected using the later mentioned region-based matching method, the detected positional shift amount can be converted into the defocus amount using a predetermined conversion coefficient. The defocus amount on the image side can easily be converted into the object distance on the object side using the image forming relationship of the imaging optical system 120.

<Description of Distance Range Calculator>

Figure 3A:
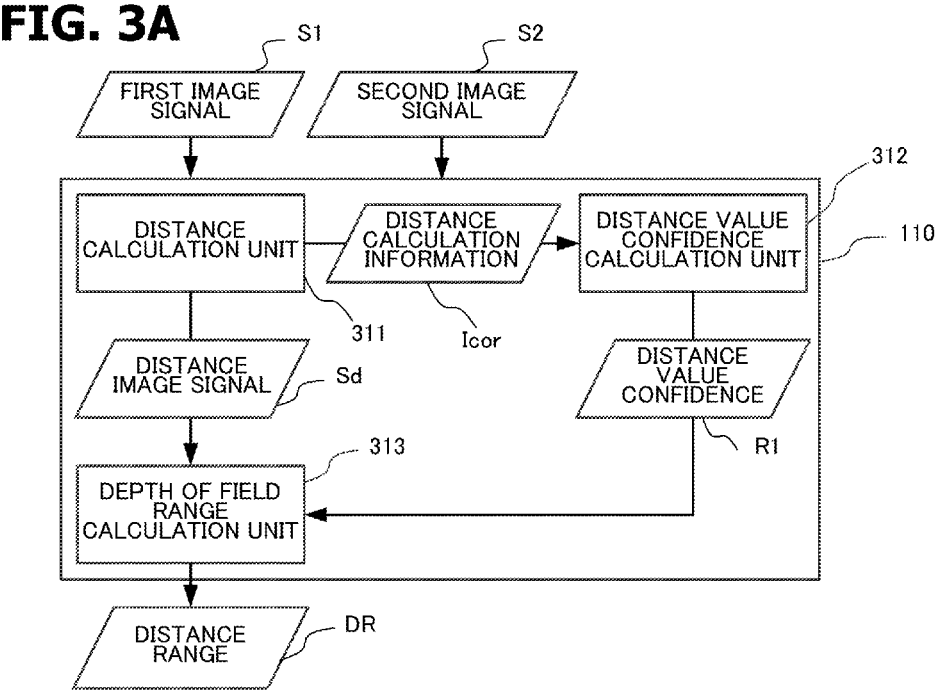
FIG. 3A to FIG. 3C are diagrams depicting processing of the distance range calculator according to Embodiment 1.
Figure 3B:
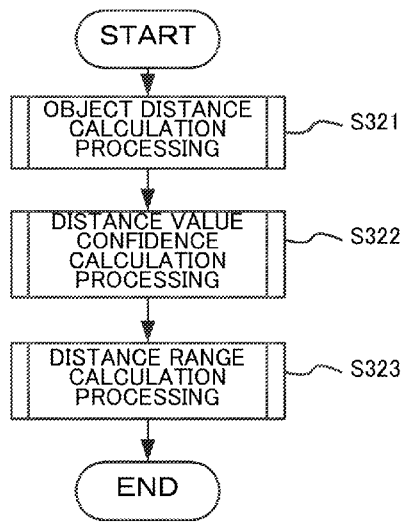

The distance range calculator 110 of this embodiment will now be described with reference to FIG. 3. FIG. 3A is a block diagram depicting the processing overview of the distance range calculator 110 of this embodiment, and FIG. 3B is a flow chart depicting the operation of the distance range calculator 110.

The distance calculation unit 311 of the distance range calculator 110 reads the first image signal S1 and the second image signal S2 from the imaging element 101, and calculates the object distance at a plurality of pixel positions in the object distance calculation processing S321.

Figure 4A:
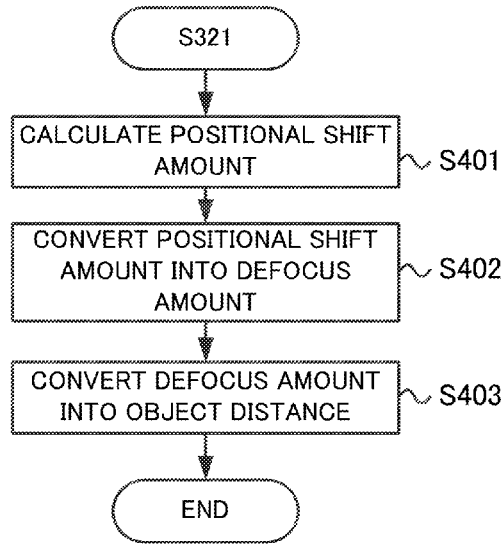
FIG. 4A to FIG. 4C are diagrams depicting processing of the distance range calculator according to Embodiment 1.

The concrete processing content of the object distance calculation processing S321 will now be described with reference to FIG. 4A. In step S401, the distance calculation unit 311 calculates the relative positional shift amount between the first image signal S1 and the second image signal S2. The distance calculation unit 311 sets a point of interest in the first image signal S1, and sets a collation region centered around the point of interest. Then the distance calculation unit 311 sets a reference point in the second image signal S2, and sets a reference region centered around the reference point. The distance calculation unit 311 calculates the correlation degree between the first image signal S1 included in the collation region and the second image signal S2 included in the reference region, while sequentially moving the reference point, and determines the reference point having the highest correlation degree as a corresponding point. The distance calculation unit 311 calculates the relative positional shift amount between the point of interest and the corresponding point, as the positional shift amount at the point of interest. By calculating the positional shift amount while sequentially moving the point of interest, the positional shift amount at a plurality of pixel positions can be calculated.

To calculate the correlation degree, a known method can be used, such as the normalized cross-correlation (NCC) method, that evaluates the normalized cross-correlation between image signals. In step S402, the distance calculation unit 311 converts the positional shift amount into a defocus amount, which is a distance from the imaging element 101 to the focal point of the imaging optical system 120 using a predetermined conversion coefficient. The image shift amount d can be converted into the defocus amount $\Delta L$ using the following Expression 1, where Gain denotes a predetermined conversion coefficient, $\Delta L$ denotes the defocus amount, and d denotes the positional shift amount.

$$\Delta L = \text{Gain} \times d$$

In step S403, the distance calculation unit 311 converts the defocus amount into the object distance. The conversion from the defocus amount into the object distance can be performed using the image forming relationship of the imaging optical system 120, as mentioned above. The distance image signal Sd constituted by the object distance at each pixel position can be generated by performing the object distance calculation processing in FIG. 4A at a plurality of pixel positions.

The distance value confidence calculation unit 312 calculates the confidence R1, which indicates the certainty of the value of the object distance in the distance value confidence calculation processing S322 using the distance calculation information Icor acquired from the distance calculation unit 311.

Figure 4B:
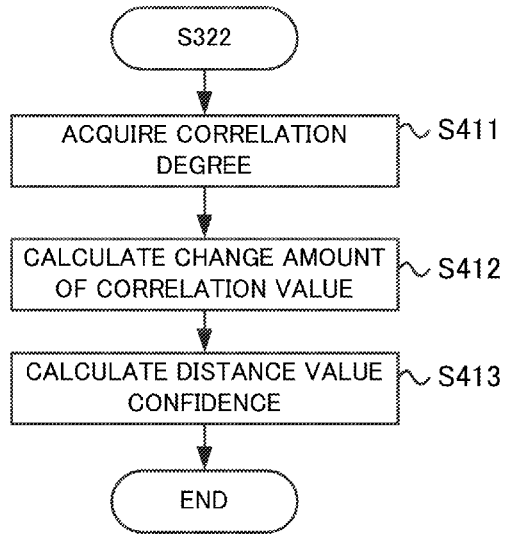

The concrete processing content of the distance value confidence calculation processing S322 will now be described with reference to FIG. 4B. In step S411, as the distance calculation information Icor, the distance value confidence calculation unit 312 acquires the correlation degree between the point of interest and the corresponding point used when the positional shift amount was calculated in step S401. In this case, if the correlation degree is low, it is highly probable that the correlation was incorrectly evaluated due to the influence of noise included in the image signal or the like. In step S412, the distance value confidence calculation unit 312 acquires the correlation degree in the vicinity of the corresponding point, used when the positional shift amount was calculated in step S401, as the distance calculation information Icor, and calculates the change amount between the correlation degree in the vicinity of the corresponding point and the correlation degree of the corresponding point. The correlation degree in the vicinity of the corresponding point may be the correlation degree at a pixel adjacent to the corresponding point, or a correlation degree at a pixel distant from the corresponding point by a predetermined number of pixels, or may be an average of the correlation degrees of a plurality of pixels around the corresponding point. If the contrast of the object does not change significantly, the change amount of the correlation degree becomes small, and in this case as well, the probability that the correlation was incorrectly calculated is high. In step S413, the distance value confidence calculation unit 312 calculates the ratio of the contrast change and the noise amount (SN ratio of the image) as the distance value confidence R1 (corresponds to the first confidence). The change amount of the correlation degree is higher as the contrast change is higher. Further, the correlation degree at the corresponding point is lower as the noise amount is higher. Therefore the distance value confidence R1 should be calculated so as to be higher as the change amount of the correlation degree is higher, and to be higher as the correlation degree at the corresponding point is higher. For example, the distance value confidence R1 is calculated as (change amount of correlation degree)/(1−correlation degree at corresponding point).

The distance range calculation unit 313 calculates the distance range DR of the object in the distance range calculation processing S323, using the distance image signal Sd acquired from the distance calculation unit 311 and the distance value confidence R1 acquired from the distance value confidence calculation unit 312.

Figure 4C:
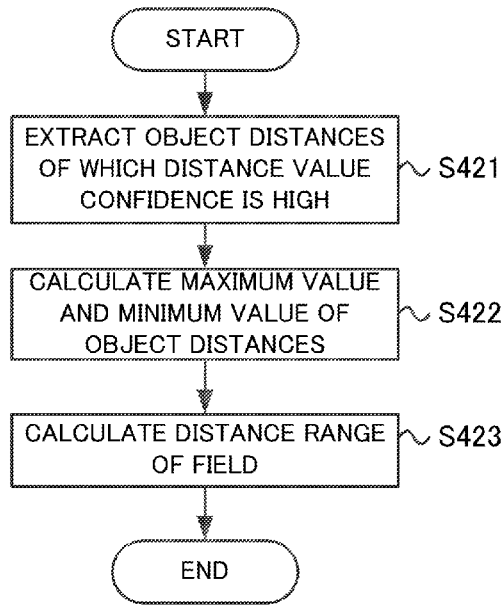

The concrete processing content of the distance range calculation processing S323 will now be described with reference to FIG. 4C. In step S421, the distance range calculation unit 313 extracts the object distances at the pixel positions of which distance value confidence R1 was determined as high, based on the distance image signal Sd. In this case, whether the distance value confidence R1 is high or not can be determined by determining whether the distance value confidence R1 is a predetermined threshold or more. In step S422, the distance range calculation unit 313 calculates the maximum value and the minimum value of the object distances extracted in step S421. In step S423, the distance range calculation unit 313 determines the distance range DR of the object of which upper limit value and lower limit value are the maximum value and the minimum value respectively calculated in step S421.

In step S422, the distance range may be calculated using the average value and the standard deviation which are statistical values of the object distances, instead of calculating the distance range using the maximum value and the minimum value of the extracted object distances. In concrete terms, the distance range calculation unit 313 may calculate an average value and the standard deviation of the extracted object distances, and the distance range DR of the object may be determined regarding a value generated by adding the average value and triple the standard deviation as the upper limit value, and a value generated by subtracting triple the standard deviation from the average value as the lower limit value. Triple the standard deviation need not be used, but values that are different from the average value by a predetermined multiple of the standard deviation may be determined as the upper limit value and lower limit value. Since the standard deviation, which is a statistical value, is used, the influence on the calculation of the distance range of the object can be minimized even if an incorrect value is included in the distance value confidence calculated by the distance value confidence calculation unit 312.

When the average value and the standard deviation are calculated, the object distances constituting the distance image signal Sd may be weighted based on the distance value confidence R1. In concrete terms, the distance range calculation unit 313 may calculate the weighted average value and the weighted standard deviation of the object distances using the distance value confidence R1 as the weight, and calculate the distance range DR of the object in the same manner. The weight need not be the distance value confidence R1 itself, but any weight, which becomes larger as the distance value confidence R1 is higher, can be used. The average value and the standard deviation may be determined including the object distances of which distance value confidence R1 is less than a threshold, or may be determined using only the object distances of which distance value confidence R1 is the threshold or more. The latter is an example of setting the weight to zero when the distance value confidence R1 is less than the threshold. By calculating the average value and the standard deviation using the distance value confidence R1 as weight, the distance range can be calculated more accurately.

In some cases, the distance image signal Sd, calculated by the distance calculation unit 311 constituting the distance range calculator 110 of this embodiment, may include a region of which object distance value was incorrectly calculated, and a region in which position of the object distance was incorrectly calculated. Incorrect calculation of the object distance value means incorrectly calculating the distance value of the object itself. Incorrect calculation of the object distance value occurs when the contrast of the object does not change significantly, or when noise is included in the image signal. Incorrect calculation of the object distance position means calculating the distance of a pixel (position), which is different from the distance calculation target pixel (position), as the distance value of the distance calculation target pixel (position). Incorrect calculation of the object distance position mainly occurs at a boundary of the objects located at different distances.

Figure 3C:
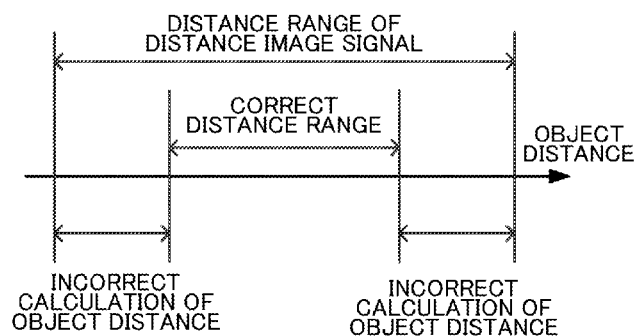

FIG. 3C is a diagram of which abscissa indicates the object distance. When a region, where an object distance value constituting the distance image signal Sd was incorrectly calculated, is included, the distance range determined by the maximum value and the minimum value of the object distances included in the distance image signal may become wider than a correct distance range (actual distance range of the object) in some cases. On the other hand, a region, in which the object distance position was incorrectly calculated, does not influence the calculation accuracy of the distance range significantly. This is because even if the object distance position is incorrect, the calculated distance value is still an object distance value. According to the distance range calculator 110 of this embodiment, a region, in which the object distance value was incorrectly calculated, is extracted using the distance value confidence R1, and the distance range is determined using only the distances of the regions in which the object distance value was correctly calculated, hence the distance range can be calculated accurately. Further, the region, in which the object distance value was incorrectly calculated, is extracted by simple processing, hence unnecessary processing is not required, and the distance range of the object can be efficiently extracted.

Figure 5A:
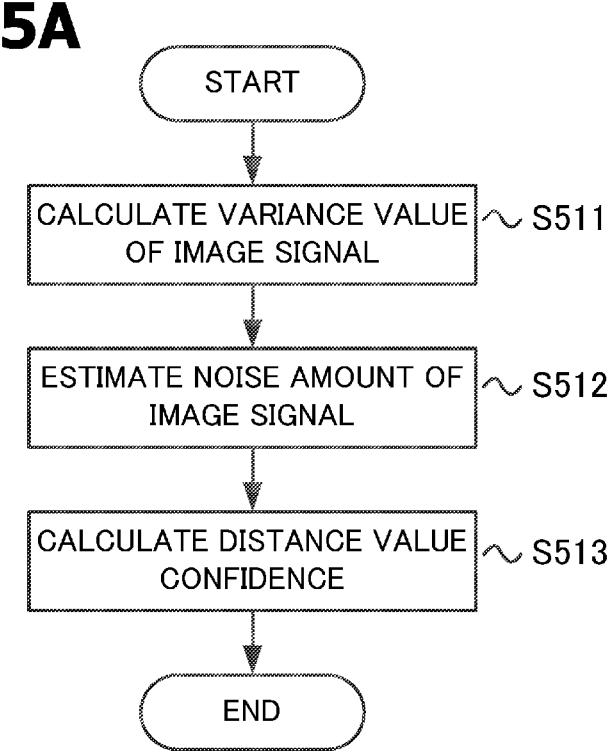
FIG. 5A and FIG. 5B are diagrams depicting processing of the distance range calculator according to Embodiment 1.

According to this embodiment, the distance value confidence R1 is calculated by evaluating the ratio of the level of the contrast change and the noise amount level for the first image signal and the second image signal. In other words, the SN ratio of the image signal (image SN ratio) is evaluated. The image SN ratio may be calculated from the first image signal used for setting the collation region, instead of the correlation degree used for calculating the positional shift amount. FIG. 5A is a flow chart when the distance value confidence R1 is calculated from the first image signal S1. In step S511, the distance value confidence calculation unit 312 calculates a variance value of the first image signal included in the collation region. As the variance value is greater, the contrast change of the first image signal included in the collation region increases. In step S512, the distance value confidence calculation unit 312 estimates the noise amount included in the image signal, based on the pixel value of the first image signal included in the collation region. The noise amount included in the image signal can be estimated by noise amount=noise estimation coefficient×pixel value×ISO sensitivity. This is because the optical shot noise amount generated in photoelectric conversion is in proportion to the square root of the number of photons. For the noise amount estimation coefficient, a value acquired by measuring the noise characteristic of the imaging element 101 in advance may be used. For the ISO sensitivity, the ISO sensitivity, which the digital camera 100 used for photographing, is used. In step S513, the distance value confidence calculation unit 312 calculates the ratio of the variance value and the noise amount as the distance value confidence R1.

Figure 5B:
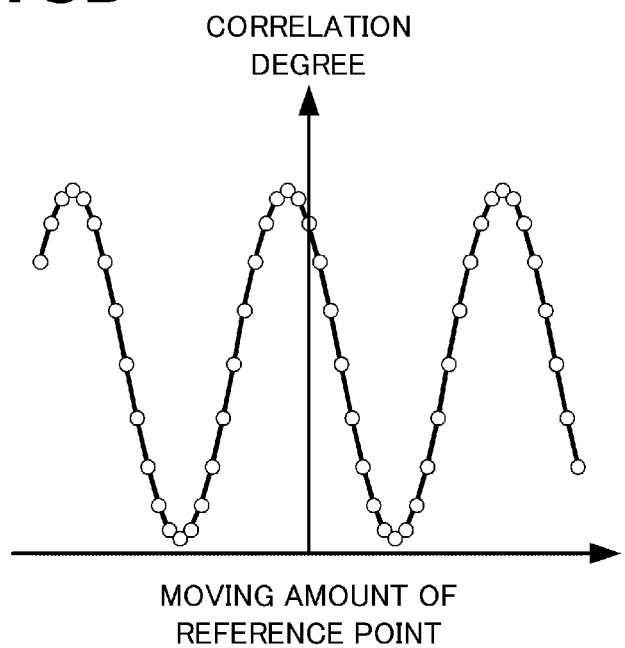

Other factors of calculating the value of the object distance incorrectly are: the brightness saturation which is generated when pixel values are saturated during photographing; and the cyclic object which is an object of which contrast changes cyclically. Therefore in order to more accurately evaluate the distance value confidence, the brightness saturation degree may be used in addition to the image SN ratio. The brightness saturation degree is a ratio of the regions where the brightness of the first image signal is saturated, with respect to the collation regions. Further, whether incorrect evaluation of the correlation was caused by a cyclic object may be determined and considered when the distance value confidence is evaluated. FIG. 5B is a graph showing the relationship between the correlation degree and the moving amount of the reference point when a cyclic object is photographed. When a cyclic object is photographed, the correlation degree has a cyclic maximum value since the contrast changes cyclically. Hence whether the object is a cyclic object or not can be determined by evaluating whether the moving amount of the reference point, at which the correlation degree has the maximum value, changes cyclically. The distance value confidence calculation unit 312 of this embodiment determines the brightness saturation degree and the object cyclicity of the object, in addition to the image SN ratio, to calculate the distance value confidence. Thereby the certainty of the distance value can be evaluated at higher precision, and the distance range calculation unit 313 can calculate the distance range of the object more accurately. Depending on the object and photographing conditions, it is not necessary to use: the image SN ratio, the brightness saturation degree and the cyclicity of the object, and the distance value confidence may be calculated using at least one of these.

<Other Forms of Object Distance Calculation Method>

Figure 6A:
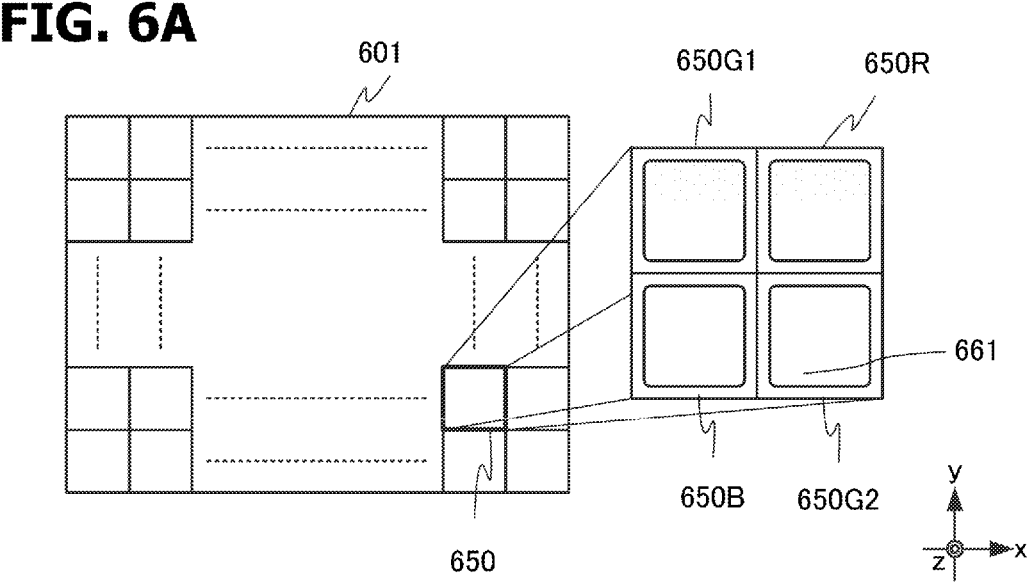
FIG. 6A to FIG. 6D are diagrams depicting a modification of the imaging apparatus according to Embodiment 1.

In the digital camera 100 of this embodiment, the object distance calculation based on the imaging plane phase difference ranging method is performed using the imaging element 101 where two photoelectric conversion units are disposed in one pixel, but the object distance may be calculated based on other ranging principles. In the digital camera 100 of this embodiment, the DFD method may be used, where the object distance is calculated using the first image signal and the second image signal photographed with changing the photographing conditions, by using not the imaging element 101 but an imaging element 601 of which xy cross-sectional view is shown in FIG. 6A. In other words, the distance calculation unit 311 in FIG. 3A generates the distance image signal according to the processing content which will be described later with reference to FIG. 6D.

The imaging element 601 in FIG. 6A is constituted by a plurality of pixel groups 650, where each pixel group consists of two rows×two columns. In each pixel group 650, a green pixel 650G1 and a green pixel 650G2 are disposed diagonally, and a red pixel 650R and a blue pixel 650B are disposed in the other two pixels. In each pixel, only one photoelectric conversion unit 661 is disposed.

Figure 6B:
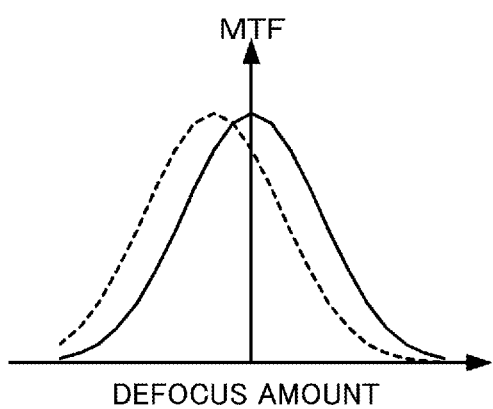
Figure 6C:
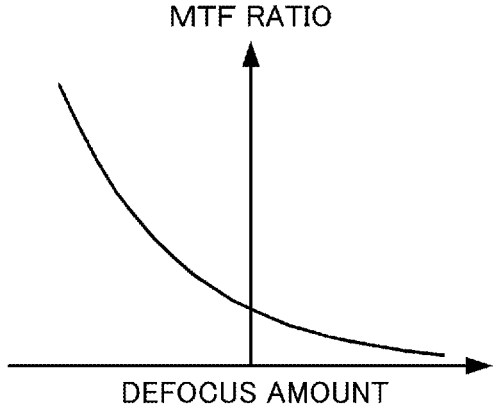

In FIG. 6B, the solid line indicates the modulation transfer function (MTF) of the first imaging condition, and the broken line indicates the MTF of the second imaging condition, where the first imaging condition and the second imaging condition are different in the focusing position. The abscissa indicates the defocus amount, and the ordinate indicates the MTF. By photographing consecutively in a time series, with changing the focusing position under the first imaging condition and the second imaging condition, imaging can be performed with changing the dependency of the MTF on the defocus amount. FIG. 6C shows the ratio of the MTF under the first imaging condition and the MTF under the second imaging condition. It is shown that the MTF ratio changes depending on the defocus amount. If the DFD method is used, the difference of the MTF (that is, the difference of blur amount) can be calculated by evaluating the correlation between the first image signal photographed under the first imaging condition and the second image signal photographed under the second photographing condition, whereby the defocus amount can be detected. By converting the detected defocus amount into the object distance based on the image forming relationship of the imaging optical system 120, similarly to the above mentioned imaging plane phase difference ranging method, the object distance can be calculated.

Figure 6D:
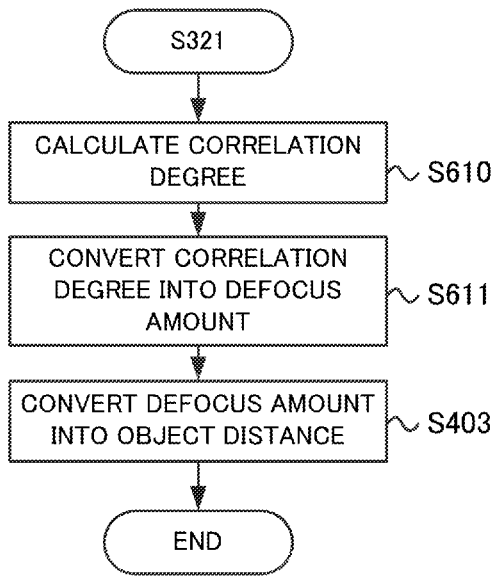

FIG. 6D is a flow chart depicting the processing content of the object distance calculation processing S321 performed by the distance calculation unit 311. In step S610, the correlation degree between the first image signal and the second image signal is calculated. In other words, a point of interest is set in the first image signal, and a collation region centered around the point of interest is set. Then a reference point is set in the second image signal in a position corresponding to the point of interest, and a reference region centered around the reference point is set. Then the correlation degree between the first image signal included in the collation region and the second signal included in the reference region is calculated. In step S611, the processing to convert the correlation degree into the defocus amount is performed. To convert the correlation degree into the defocus amount, a lookup table, to indicate the correspondence, may be stored in the memory (not illustrated) of the digital camera 100 in advance for reference. For example, when the correlation degree is high ("1" if NCC is used as the correlation degree), it is assumed that the blur amount of the first image signal and that of the second image signal are approximately the same, hence the defocus amount is indicated by the point where the solid line and the broken line cross in FIG. 6B. In step S403, the processing to convert the defocus amount into the object distance is performed, similarly to processing in FIG. 4A.

The distance value confidence calculation unit 312 of the distance range calculator 110, which uses the DFD method as the ranging method, can calculate the distance value confidence using the method described in FIG. 5A. Another factor of calculating the value of the object distance incorrectly is the brightness saturation. Therefore whether a region of which brightness is saturated is included in the first image signal in the collation region may be determined in addition to the image SN ratio.

Even if the DFD method is used as the ranging method, the distance image signal calculated by the distance calculation unit 311 may include a region in which the object distance value was incorrectly calculated, and a region in which the object distance position was incorrectly calculated. Even in such a case, the distance range of the object can be accurately determined by extracting the region in which the object distance value was incorrectly calculated, and determining the distance range of the object using the distance values excluding the above region.

Embodiment 2

Embodiment 2 of the present invention is an imaging apparatus having a distance confidence calculation apparatus (distance information processing apparatus) that calculates the confidence of the object distance. Embodiment 2 of the present invention will now be described in detail with reference to the drawings. In the following description, a case of a digital camera will be described as an example of an imaging apparatus having the distance confidence calculation apparatus of the present invention, but application of the present invention is not limited to this.

The digital camera 100 of this embodiment is constituted by an imaging optical system 120, an imaging element 101, a distance confidence calculation apparatus 701, an image generation unit (not illustrated), a lens driving control unit (not illustrated), and an image signal storage unit (not illustrated), which are disposed inside a camera case body 190. In other words, compared with Embodiment 1 (FIG. 1), the digital camera 100 of this embodiment has the distance confidence calculation apparatus 701 instead of the distance range calculator 110. The distance confidence calculation apparatus 701 can be constructed using a logic circuit. For another format, the distance confidence calculation apparatus 701 may be constituted by a central processing unit (CPU) and a memory that stores processing programs.

Figure 7A:
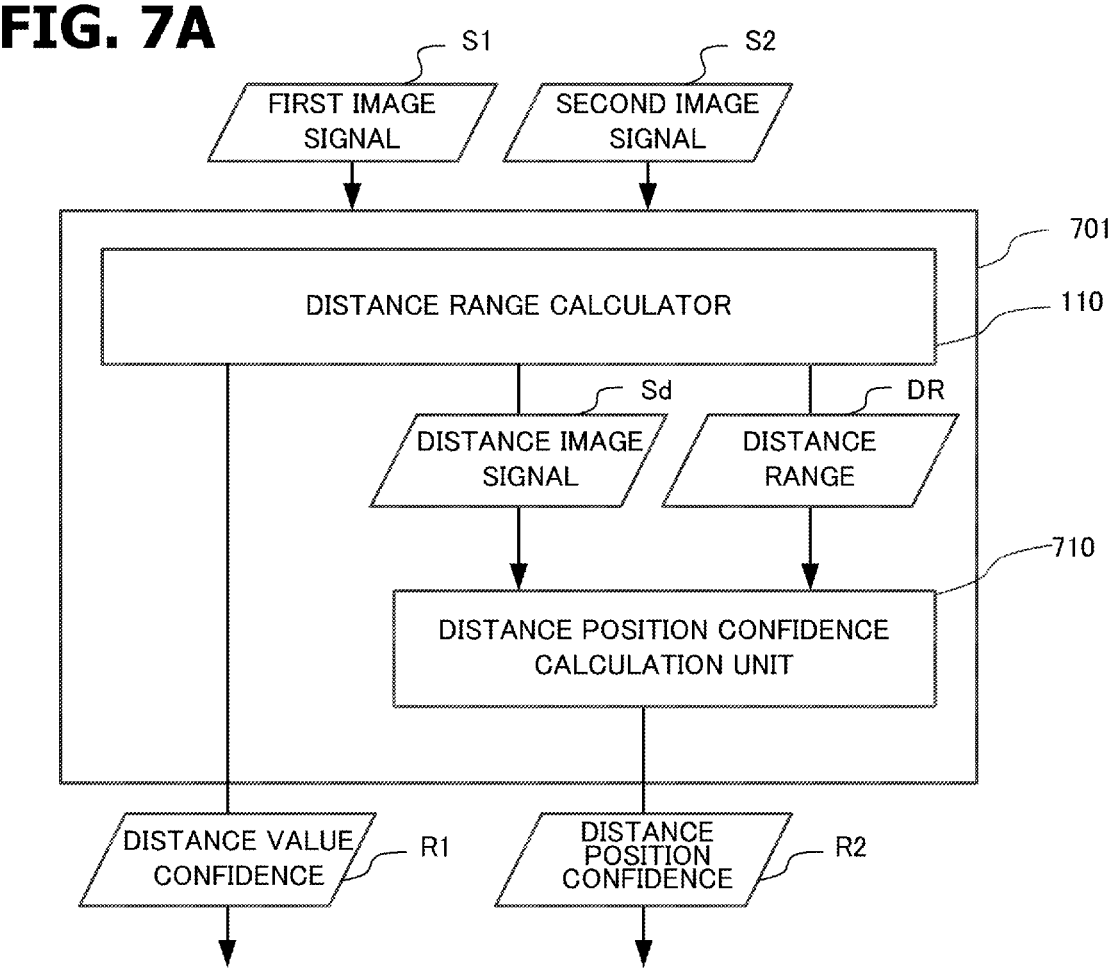
FIG. 7A and FIG. 7B are diagrams depicting processing of a distance confidence calculation apparatus according to Embodiment 2.

FIG. 7A is a block diagram depicting a processing overview of the distance confidence calculation apparatus 701 of this embodiment. The distance confidence calculation apparatus 701 reads a first image signal S1 and a second image signal S2 from the imaging element 101, and calculates a distance image signal Sd, a distance confidence R1 and a distance range DR using the distance range calculator 110. The distance position confidence calculation unit 710 receives the distance image signal Sd and the distance range DR from the distance range calculator 110, and calculates the distance position confidence R2, which indicates the certainty of the position in the imaging plane of the object distance constituting the distance image signal. In other words, the distance confidence calculation apparatus 701 calculates the distance value confidence R1 and the distance position confidence R2, and outputs these values.

Figure 7B:
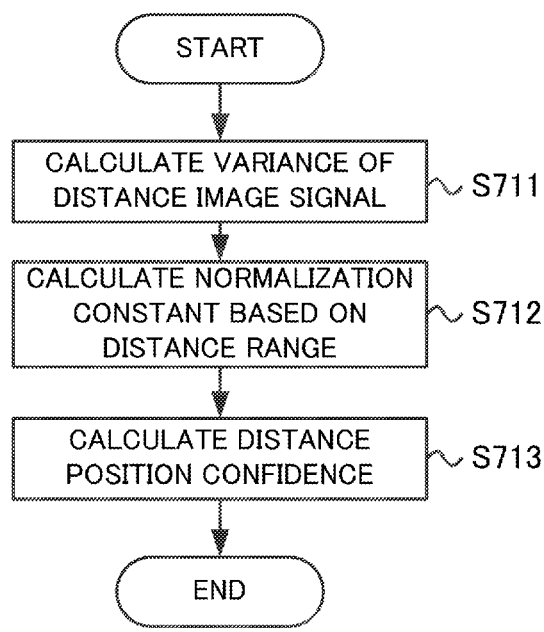

The processing content performed by the distance range calculator 110 is the same as Embodiment 1, hence description thereof is omitted. The distance value confidence R1 can be calculated by the processing performed by the distance range calculator 110. The processing content performed by the distance position confidence calculation unit 710 will be described with reference to the flow chart shown in FIG. 7B.

In step S711, the distance position confidence calculation unit 710 sets a point of interest in the distance image signal Sd, and sets a variance value calculation region centered around the point of interest. Then the distance position confidence calculation unit 710 calculates the variance value of the distance image signal Sd included in the variance value calculation region. The distance position confidence calculation unit 710 calculates the variance value at each pixel position of the distance image signal Sd by calculating the variance value while sequentially moving the point of interest. The size of the variance value calculation region can be a size the same as the size of the collation region, which the distance calculation unit 311 of the distance range calculator 110 used. Regions of which calculated variance value is large include a region in which the magnitude of distance change is high. Therefore the variance value can be an index to indicate the magnitude of the object distance change in the in-plane direction of the imaging plane.

It is highly possible that the position of the object distance is uncertain in a region in which the magnitude of the object distance change is high, but uncertainty is different depending on the width of the distance range DR, even if the variance value is the same. In step S712, the distance position confidence calculation unit 710 calculates the constant to normalize the variance value calculated in step S711 (normalization constant) based on the distance range DR calculated by the distance range calculator 110. The normalization constant is calculated to be greater as the width of the distance range DR (difference between the upper limit value and the lower limit value) is wider. In step S713, the distance position confidence calculation unit 710 sets the value generated by normalizing the variance value calculated in step S711 using the normalization constant calculated in step S712, as the distance position confidence R2 (corresponds to the second confidence).

Figure 8A:
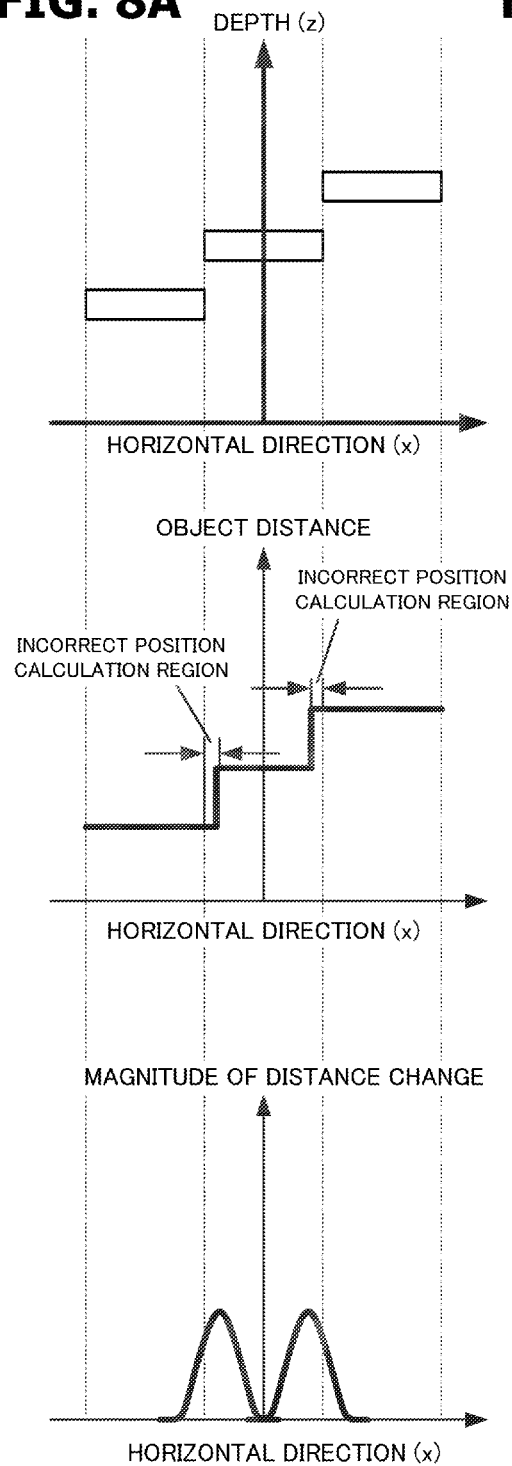
FIG. 8A and FIG. 8B are diagrams depicting the relationship between a distance position confidence and the object distance.
Figure 8B:
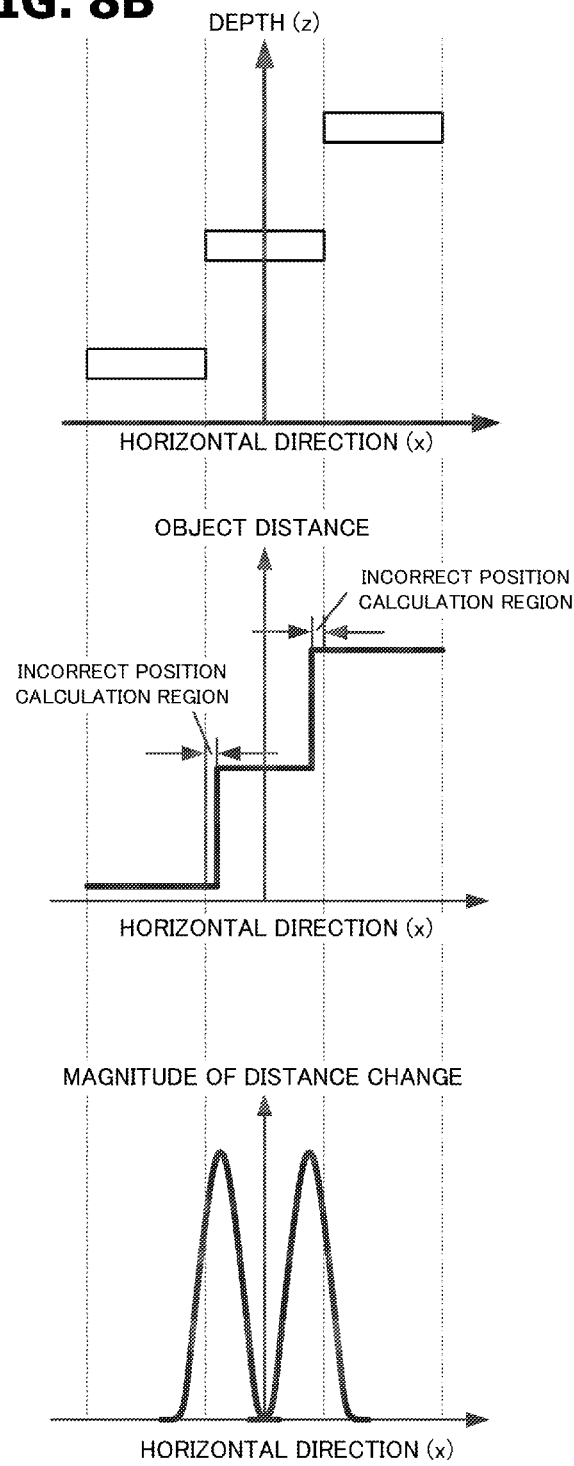

According to this embodiment, the magnitude of the distance change is normalized using the normalization constant calculated based on the distance range DR which was calculated by the distance range calculator 110. This is because the confidence must be evaluated high when the distance range of the object is wide, and the confidence must be evaluated low when the distance range of the object is narrow, even if the magnitude of the distance change is the same. The reason for this will be described with reference to FIG. 8A and FIG. 8B. The top diagrams in FIG. 8A and FIG. 8B show the state of the objects on the xz plane. The three objects are disposed at different depth positions. In the middle diagrams, the abscissa indicates the horizontal position, and the ordinate indicates the object distance. In the bottom diagrams, the ordinate indicates the magnitude of the distance change. FIG. 8A is a case when the distance range of the object is narrow, and FIG. 8B is a case when the distance range of the object is wide. If the distance range of the object is narrow, as in the case of FIG. 8A, it is highly possible that the magnitude of the distance change is low, as shown in the bottom diagram. If the distance range of the object is wide, as in the case of FIG. 8B, on the other hand, it is highly probable that the magnitude of the distance change is high, as shown in the bottom diagram. Therefore if a normalization constant, of which value becomes greater as the distance range is wider, is set and the magnitude of the distance change is normalized by this normalization constant, then the confidence of the distance position can be uniformly evaluated regardless of the distance range. As a result, the distance position confidence R2, to indicate the certainty of the position of the object distance, can be calculated with certainty with respect to the positional relationship of the objects to be photographed.

The distance position confidence calculation unit 710 of this embodiment calculates the variance value of the distance image signal in order to calculate the magnitude of the distance change in step S711, but may calculate the standard deviation, which is the square root of the variance value. Further, the distance position confidence calculation unit 710 may evaluate the magnitude of the distance change in the in-plane direction of the imaging plane by using a differential filter (primary differential filter or secondary differential filter) on the distance image signal. By any of these methods, the distance position confidence R2, with respect to the positional relationship of the object, can be calculated with certainty by normalizing the magnitude of the distance change using a normalization constant based on the distance range.

According to this embodiment, the distance position confidence R2 is calculated by normalizing the magnitude of the distance change calculated in step S711 using the normalization constant calculated in step S712, but critical here is normalizing the magnitude of the distance change according to the distance range DR of the object. For example, the magnitude of the distance change may be calculated for a normalized distance image signal, which is generated by normalizing the distance image signal Sd using a normalization constant based on the distance range DR.

When a region of high confidence and a region of low confidence are separated in the threshold processing with respect to the distance position confidence, a threshold for this determination may be changed according to the distance range, instead of normalizing the magnitude of the distance change using the normalization constant based on the distance range. In this case, a region of which magnitude of the distance change is the normalized threshold or more is determined as a region of high confidence, and a region of which magnitude of the distance change is less than the normalized threshold is determined as a region of low confidence.

Embodiment 3

Embodiment 3 of the present invention is an imaging apparatus having a distance image signal correction apparatus (distance information processing apparatus) that corrects the object distance based on the distance position confidence. Embodiment 3 of the present invention will now be described in detail with reference to the drawings. In the following description, a case of a digital camera will be described as an example of the imaging apparatus having the distance image signal correction apparatus of the present invention, but application of the present invention is not limited to this.

The digital camera 100 of this embodiment is constituted by an imaging optical system 120, an imaging element 101, a distance image signal correction apparatus 901, an image generation unit (not illustrated), a lens driving control unit (not illustrated), and an image signal storage unit (not illustrated), which are disposed inside a camera case body 190. In other words, compared with Embodiment 1 (FIG. 1), the digital camera of this embodiment has the distance image signal correction apparatus 901 (hereafter also called "correction apparatus 901") instead of the distance range calculator 110. The distance image signal correction apparatus 901 can be constructed using a logic circuit. For another format, the correction apparatus 901 may be constituted by a central processing unit (CPU) and a memory that stores processing programs.

Figure 9A:
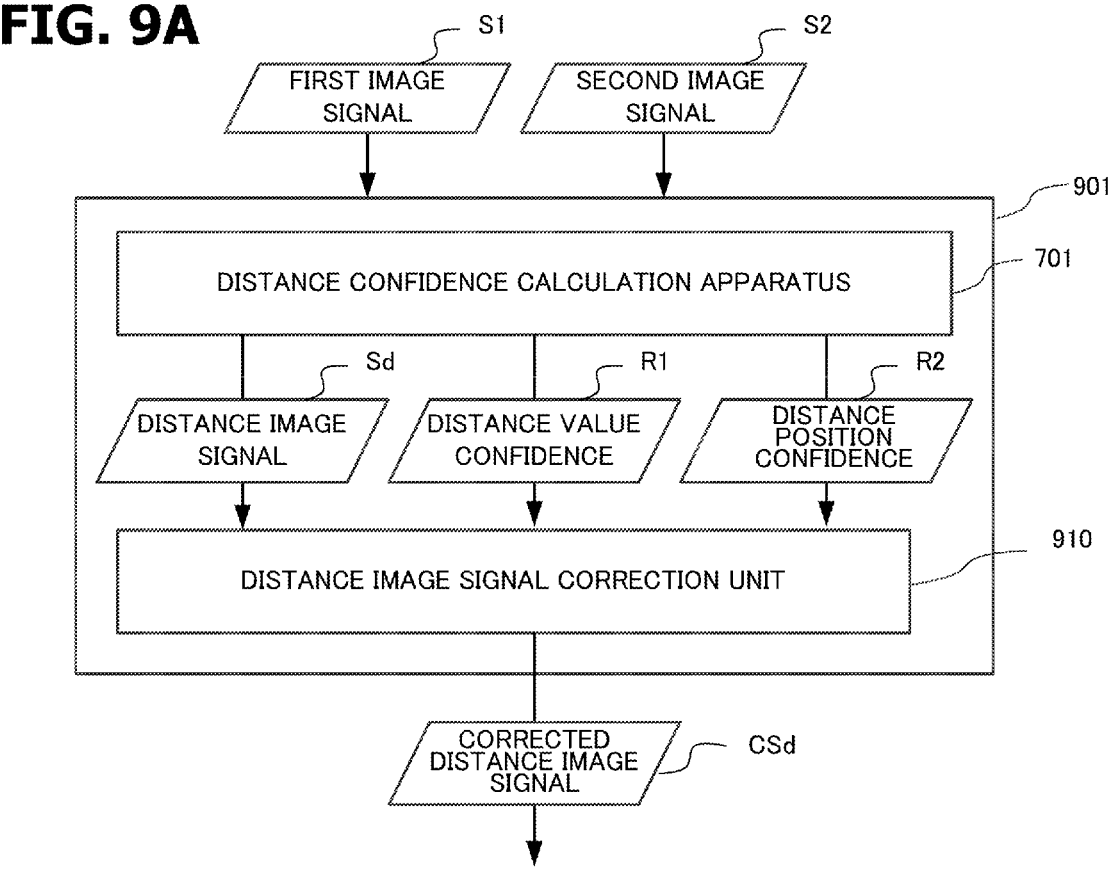
FIG. 9A and FIG. 9B are diagrams depicting processing of a distance image signal correction apparatus according to Embodiment 3.

FIG. 9A is a block diagram depicting a processing overview of the correction apparatus 901 of this embodiment. The correction apparatus 901 reads a first image signal S1 and a second image signal S2 from the imaging element 101, and calculates a distance image signal Sd, a distance value confidence R1, and a distance position confidence R2 using the distance confidence calculation apparatus 701. A distance image signal correction unit 910 (hereafter called "correction unit 910") receives the distance image signal Sd, the distance value confidence R1 and the distance position confidence R2 from the distance confidence calculation apparatus 701, calculates a corrected distance image signal CSd by correcting the distance image signal Sd, and outputs the corrected distance image signal CSd.

The processing content performed by the distance confidence calculation apparatus 701 is the same as Embodiment 2, hence description thereof is omitted. The distance image signal Sd calculated by the distance confidence calculation apparatus 701 includes object distances which are dispersed due to the influence of noise in the image signal, a region in which the object distance value was incorrectly calculated, and a region in which the object distance position was incorrectly calculated.

Figure 9B:
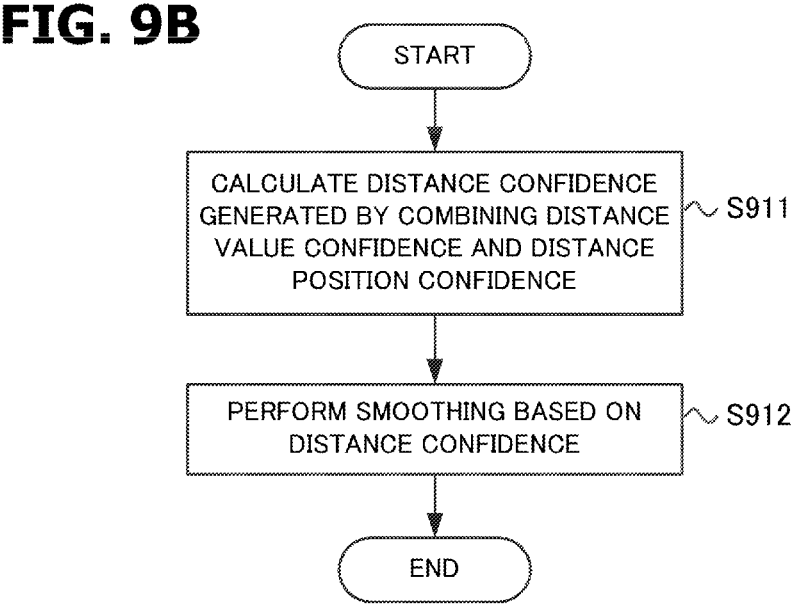

The correction unit 910 performs smoothing for the distance image signal Sd using a smoothing filter, which was weighted by the distance value confidence R1 and the distance position confidence R2. By increasing the weight as the region has the higher distance value confidence R1 and distance position confidence R2, a corrected distance image signal CSd, that includes object distances having a higher confidence, can be generated. The concrete processing content will be described with reference to the flow chart in FIG. 9B.

In step S911, the correction unit 910 calculates a distance confidence R0 by combining the distance value confidence R1 and the distance position confidence R2. In concrete terms, the distance confidence R0 can be calculated by adding the distance value confidence R1 and the distance position confidence R2. In step S912, the correction unit 910 sets a point of interest in the distance image signal Sd, and sets a smoothing region centered around the point of interest. The correction unit 910 calculates the corrected object distance of the point of interest by determining an average of the object distances within the smoothing region with weighting the distance image signal Sd based on the distance confidence R0. In other words, the correction unit 910 performs, on the distance image signal Sd, weighted smoothing filtering with a higher weight in the region as the distance confidence R0 is higher, whereby the corrected object distance is calculated. It is preferable that the weight of the weighted smoothing filtering is set higher as the pixel distance to the point of interest is shorter. By calculating the corrected object distance while sequentially moving the point of interest, the corrected distance image signal CSd, constituted by the corrected object distance, can be generated.

In this embodiment, weighted smoothing is performed for the distance image signal based on the distance confidence R0 generated by combining the distance value confidence R1 and the distance position confidence R2, therefore the corrected distance image signal CSd, constituted by the object distance having a higher confidence, can be calculated.

According to this embodiment, the distance confidence R0 is calculated by adding the distance value confidence R1 and the distance position confidence R2 in step S911, but this combining is not always necessary. The distance position confidence R2 is determined in a region in which the object distance position was incorrectly calculated, hence in a region in which the distance position confidence R2 is low, the smoothing processing may be performed with increasing weight as the region has an incorrect object distance and the distance to the point of interest is shorter. Further, an ornamental image signal may be generated from at least one of the first image signal and the second image signal, and smoothing processing is performed for the ornamental image signal so that weight is increased in a pixel of which color difference or brightness difference is smaller. Furthermore, the weight in the weighted smoothing filter may be higher as the pixel distance to the point of interest is shorter. In any of these cases, the corrected object distance image CSd, constituted by an object distance with higher confidence, can be calculated by determining the weighted average for the distance image signal corresponding to the distance value confidence R1 and the distance position confidence R2.

Embodiment 4

Embodiment 4 of the present invention is an imaging apparatus that photographs objects while emitting light at a light emission quantity corresponding to the distance range of the objects. Embodiment 4 of the present invention will now be described in detail with reference to the drawings. In the following description, a case of a digital camera will be described as an example of the imaging apparatus having the distance range calculator of the present invention, a light emitting unit, and a light emission control unit, but application of the present invention is not limited to this.

Figure 10A:
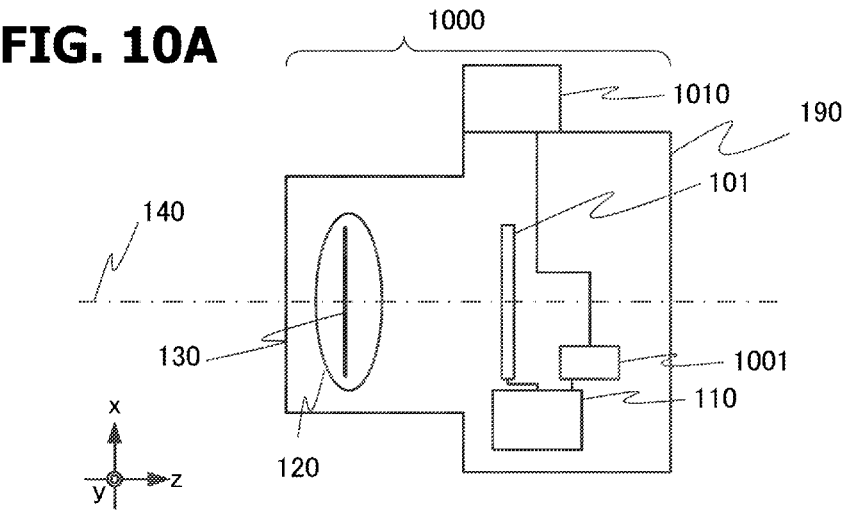
FIG. 10A to FIG. 10D are diagrams depicting an imaging apparatus according to Embodiment 4.

FIG. 10A is a diagram depicting a configuration of a digital camera 1000 according to this embodiment. The digital camera 1000 is constituted by an imaging optical system 120, an imaging element 101, a distance range calculator 110, a light emission control unit 1001, a light emitting unit 1010, an image generation unit (not illustrated), a lens driving control unit (not illustrated), and an image signal storage unit (not illustrated), which are disposed inside a camera case body 190.

Figure 10B:
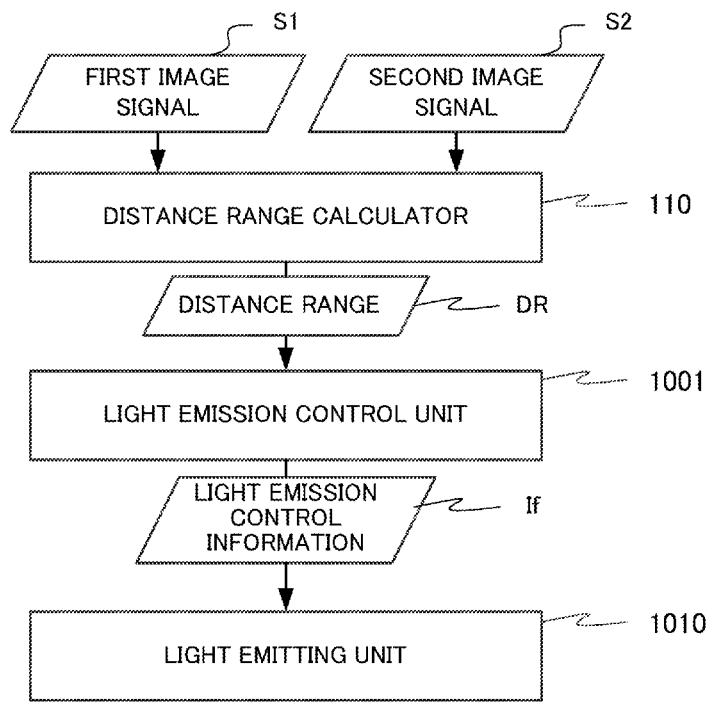

FIG. 10B is a block diagram depicting the operation of the distance range calculator 110 and the light emission control unit 1001. The distance range calculator 110 reads a first image signal S1 and a second image signal S2 from the imaging element 101, and calculates a distance range DR using a processing content the same as the processing described in Embodiment 1. The light emission control unit 1001 acquires the distance range DR from the distance range calculator 110, and calculates the light emission control information Ifc based on the distance range DR. The light emitting unit 1010 irradiates light at a light emission quantity based on the light emission control information.

The digital camera 100 performs tentative photographing, and calculates the distance image signal and the distance range. Then the digital camera 1000 performs photographing synchronizing with the light emitting unit 1010 irradiating light according to the distance range. Thereby insufficient light quantity in a dark scene can be compensated. An example of photographing in a dark scene is photographing a portrait at night.

Figure 10C:
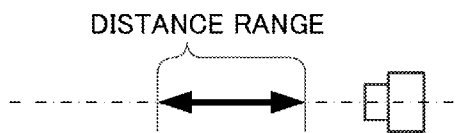
Figure 10D:
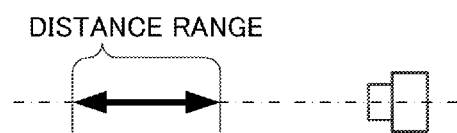

FIG. 10C and FIG. 10D are diagrams depicting a method for calculating the light emission control information by the light emission control unit 1001. FIG. 10C shows a scene where the distance range of the object is near to the camera, and FIG. 10D shows a scene where the distance range of the object is far from the camera. In the case of FIG. 10C, the distance range of the object is near to the camera, hence the object receives considerable quantity of light emitted from the light emitting unit 1010. If the light emission quantity irradiated from the light emitting unit 1010 is increased in this case, the brightness saturates (called "white clipping"), and the quality of the ornamental image drops. Therefore if the distance range of the object is near to the camera, the light emission quantity irradiated from the light emitting unit 1010 must be decreased. In the case of FIG. 10D, on the other hand, the distance range of the object is far from the camera, hence the object receives less quantity of light irradiated from the light emitting unit 1010. If the light emission quantity irradiated from the light emitting unit 1010 is decreased in this case, the object is photographed dark, and the quality of the ornamental image drops. Therefore if the distance range of the object is far from the camera, the light emission quantity irradiated from the light emitting unit 1010 must be increased. If it is assumed that the light emitting unit 1010 is sufficiently small compared with the object distance, the luminance which the object receives is in inverse proportion to the square of the object distance. Therefore it is preferable that the light emission quantity irradiated from the light emitting unit 1010 is increased in proportion to the square of the object distance.

The light emission control unit 1001 determines the object distance that represents the distance range of the object in order to evaluate whether the distance range of the object is far or near, or to determine the light emission quantity. For the representative object distance, the closest object distance (lower limit value of the distance range) may be used. Further, for the representative object distance, a distance between the closest object distance (lower limit value of the distance range) and the farthest object distance (upper limit value of the distance range), in particular an average value of these object distance values, may be used. Further, for the representative object distance, a value generated by weighting and averaging object distances having a value within the object distance range, according to the number of pixels in the distance image, may be used.

The implementation of photography in synchronization with the light emitting unit 1010 by the user is, in many cases, the implementation of portrait photography at night. In the case of performing portrait photography at night, the background region becomes black (called "black chipping"), hence contrast change is minimal. Therefore it is highly probable that the value of the object distance in the background region is calculated incorrectly. According to the digital camera 1000 of this example, even in such a photographic scene, the distance range DR of the object can be calculated at high precision by evaluating the certainty of the value of an object distance of which contribution to the calculation of the distance range is high using the distance value confidence R1. As a result, in the digital camera 1000 of this embodiment, insufficient light quantity is appropriately compensated, and a high quality ornamental image can be acquired regardless of the distance range of the object. Furthermore, it is unnecessary to emit light from the light emitting unit 1010 in advance to measure the exposure when light is emitted from the light emitting unit 1010, which conserves power of the digital camera 1000.

The light emission control unit 1001 of this embodiment calculates the light emission control information to control the light emission quantity of the light emitting unit 1010, but may control not only the light emission quantity of the light emitting unit 1010 but also the light emission quantity distribution. In other words, the light emission control unit 1001 may acquire the distance range, the distance image signal, and the distance value confidence from the distance range calculator 110, and calculate the light emission control information to control the light emission quantity distribution of the light emitting unit 1010.

Figure 11:
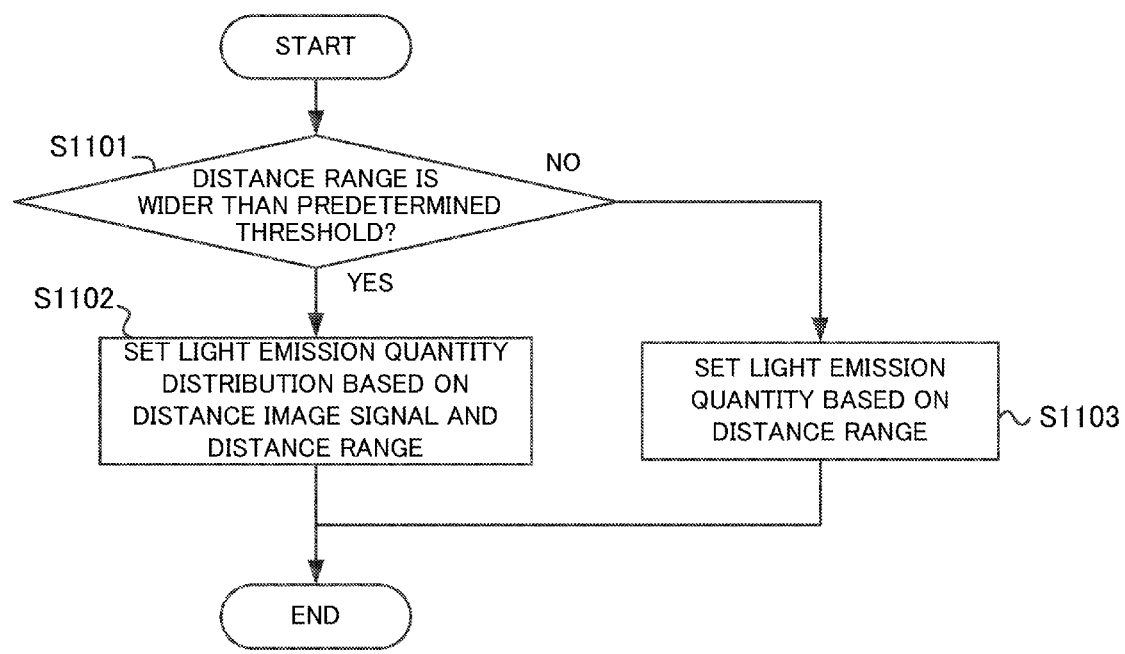
FIG. 11 is a diagram depicting light emission control processing according to Embodiment 4.

FIG. 11 is a flow chart depicting the processing by the light emission control unit 1001 when the light emission quantity distribution is controlled using the distance range DR and the distance image signal Sd. In step S1101, it is determined whether the distance range is wider than a predetermined threshold. In other words, the light emission control unit 1001 determines whether the difference between the upper limit value and the lower limit value of the distance range is wider than a threshold. If determined to be wider, the processing advances to step S1102, and if determined to be narrower, the processing advances to step S1103. When the distance range is wide, it is likely that a plurality of objects exist in the photographing angle of view. In such a case, it is preferable to set the light emission quantity distribution as the light emission control information in step S1102, so that the light emission quantity has distribution in the light emitting unit 1010. When the range is narrow, on the other hand, it is likely either that only one object exists in the photographing angle of view, or that objects are disposed close to each other. In such a case, it is not necessary to control the distribution of the light emission quantity in the light emitting unit 1010, but it is sufficient to control only the light emission quantity. In other words, in step S1103, the light emission quantity is set as the light emission control information. In step S1102, processing to calculate the light emission quantity distribution as the light emission control information is performed. The light emission quantity distribution is set so that the light emission quantity is lower in a region as the object distance in the region is shorter, and the light emission quantity is higher in a region as the object distance in the region is farther, based on the distance image signal. A region where the object distance in the distance image is outside the distance range may possibly be a region of which distance value confidence is low, or a region where the object is very close or far. If a strong light is irradiated onto such a region, the quality of the ornamental image signal may drop, hence it is preferable to set the light emission quantity distribution so that the light emission quantity is low in this region. In step S1103, the light emission quantity is set based on the distance range, as described with reference to FIG. 10B. In step S1103, it is not necessary to control the light emission quantity distribution based on the distance image signal, but here only the light emission quantity is controlled since the distance range is narrow. By determining whether the light emission quantity distribution is controlled or only the light emission quantity is controlled, based on the distance range, unnecessary processing related to the calculation of the light emission control information can be omitted, and the time lag until photographing can be minimized.

Embodiment 5

Embodiment 5 of the present invention is an imaging apparatus that changes the quantizing method depending on the distance range of the object when the distance image is quantized and saved. Embodiment 5 of the present invention will now be described in detail with reference to the drawings. In the following description, a case of a digital camera will be described as an example of the imaging apparatus that has the distance range calculator of the present invention, a distance image quantizing unit and an image signal storage unit, but application of the present invention is not limited to this.

Figure 12A:
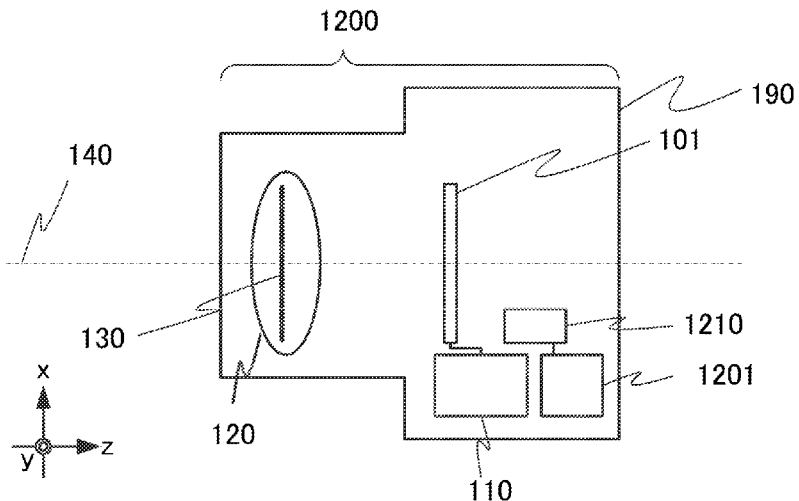
FIG. 12A to FIG. 12C are diagrams depicting an imaging apparatus according to Embodiment 5.

FIG. 12A is a diagram depicting a configuration of a digital camera 1200 according to this embodiment. The digital camera 1200 of this embodiment is constituted by an imaging optical system 120, an imaging element 101, a distance range calculator 110, a quantizing unit 1201, an image generation unit (not illustrated), a lens driving control unit (not illustrated), and an image signal storage unit 1210, which are disposed inside a camera case body 190.

Figure 12B:
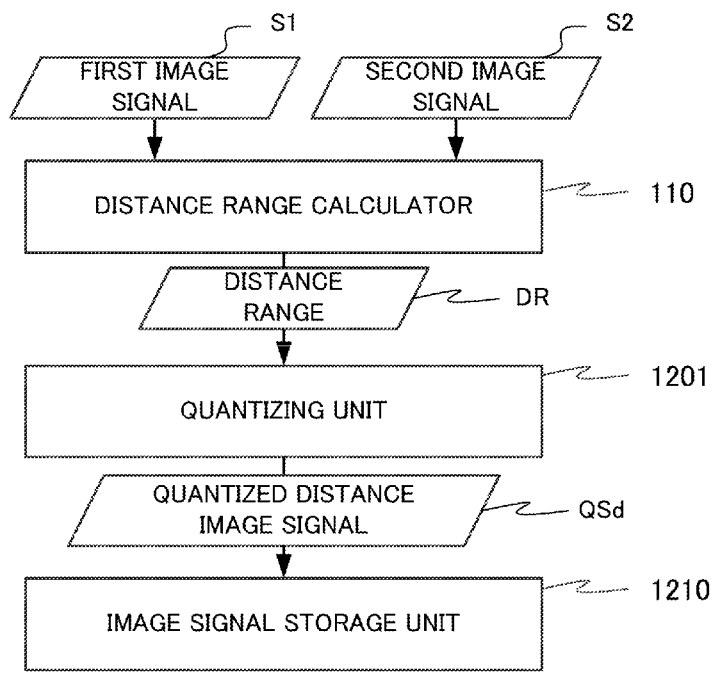

FIG. 12B is a block diagram depicting the operation of the distance range calculator 110 and the quantizing unit 1201. The distance range calculator 110 reads a first image signal S1 and a second image signal S2 from the imaging element 101, and calculates a distance range DR using the same processing content as the processing described in Embodiment 1. The quantizing unit 1201 acquires the distance range DR form the distance range calculator 110, and calculates a quantized distance image signal QSd by quantizing the distance image signal based on the distance range DR. The image signal storage unit 1210 is constituted by a memory, and stores the quantized distance image signal QSd.

Figure 12C:
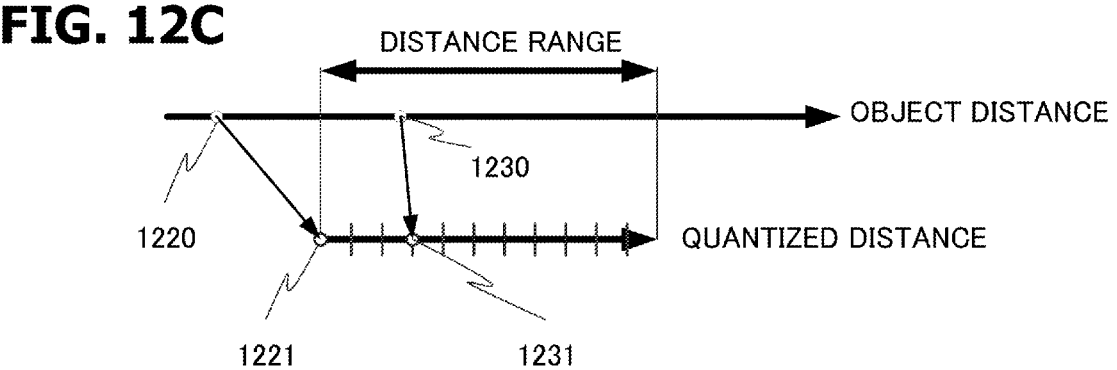

FIG. 12C is a diagram depicting a method for quantizing the distance image signal by the quantizing unit 1201. The horizontal arrow marks in FIG. 12C indicate the object distance and the quantized object distance (quantized distance). The quantizing unit 1201 sets a minimum value and a maximum value of the quantized distance range based on the distance range acquired from the distance range calculator 110. The quantizing unit 1201 divides a range between the minimum value and the maximum value in the quantized distance range by a predetermined division number (quantization rate) (e.g. division number is 256 if the quantized distance image signal is expressed in 8-bit units), and sets a quantized distance value at each division position. The quantizing unit 1201 compares the object distance and the quantized distance values, and quantizes the object distance by correlating a value closest to the object distance with the quantized distance value. In concrete terms, the quantized distance values closest to the object distance 1220 is the quantized distance 1221, which is the minimum value in the quantized distance range. Therefore the quantized distance value correlating with the value of the object distance 1220 is the quantized distance 1221. The quantized distance closest to the object distance 1230 is the quantized distance 1231. Therefore the quantized distance correlating with the value of the object distance 1230 is the quantized distance 1231. By calculating a quantized distance correlating with each object distance constituting the distance image signal, the quantized distance image signal QSd constituted by the quantized distances can be generated.

According to the imaging apparatus of this embodiment, the minimum value and the maximum value of the quantized distance range are set based on the distance range, whereby a region in which the distance value confidence is particularly high, out of the distance image signal, can be quantized at high resolution. In other words, quantization errors of the object distance can be reduced without increasing the capacity of the image signal storage unit, which is required by the quantized distance image signal. Therefore the image processing based on the quantized distance image signal (e.g. depth of field control, focus position control) can be performed at high precision after acquiring the ornamental image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-053886, filed on Mar. 17, 2015 which is hereby incorporated by reference herein in its entirety.

What is claimed is:

1. A distance information processing apparatus comprising:
   a memory and a processor, which function as:
   (1) an acquirer configured to acquire a distance image signal constituted by a plurality of distances to an object in a depth direction in regions of an image signal; and
   (2) a determiner configured to determine positional confidence of the distances for the regions of the image signal based on differences among a plurality of positions in an in plane direction perpendicular to the depth direction, the plurality of positions respectively corresponding to the plurality of distance in the depth direction, the determiner being further configured to determine the positional confidence based on at least one of (a) an object cyclicity which is calculated based on the image signal and (b) a brightness saturation degree which is calculated based on the image signal.

2. The distance information processing apparatus according to claim 1, wherein the determiner is further configured to determine the positional confidence based on an image signal-to-noise ratio of the image signal and at least one of (a) the object cyclicity and (b) the brightness saturation degree.

3. The distance information processing apparatus according to claim 1, wherein the determiner is further configured to evaluate the differences based on a variance of the distances in the distance image signal and to determine the positional confidence based on the variance.

4. The distance information processing apparatus according to claim 1, wherein the determiner is further configured:
   to determine a distance confidence representing certainty of the distance value in the distance image signal, and
   to determine the positional confidence based on the distance and the distance confidence.

5. The distance information processing apparatus according to claim 4, wherein the acquirer is further configured to acquire the distance image signal based on a relative shift amount between a first image signal and a second image signal, the first image signal and the second image signal being relatively shifted by a positional shift amount according to the distances to the object, and
   wherein the determiner is further configured to determine the distance confidence based on an image signal-to-noise ratio which is calculated based on at least one of the first image signal and the second image signal and at least one of (a) an object cyclicity which is calculated based on at least one of the first image signal and the second image signal and (b) a brightness saturation degree which is calculated based on at least one of the first image signal and the second image signal.

6. The distance information processing apparatus according to claim 4, wherein the determiner is further configured to determine a distance range, which is a range of an object distance, based on the distance image signal and the distance confidence.

7. The distance information processing apparatus according to claim 6, wherein the determiner is further configured to determine the distance range based on a maximum value and a minimum value of a part of the distances whose distance confidence is more than a threshold.

8. The distance information processing apparatus according to claim 6, wherein the determiner is further configured to determine the distance range based on an average and a standard deviation of a part of the distances whose distance confidence is more than a threshold.

9. The distance information processing apparatus according to claim 6, wherein the determiner is further configured to determine the distance range based on a weighted average and a weighted standard deviation of the distances, the weighted average and the weighted standard deviation being weighted according to the distance confidence.

10. The distance information processing apparatus according to claim 6, wherein the determiner is further configured to determine the positional confidence based on the distance range and the distances.

11. The distance information processing apparatus according to claim 6, wherein the determiner is further configured to calculate a normalization constant based on a width of the distance range and to determine the positional confidence as a normalized value of a magnitude of the differences among the plurality of positions in the distance image signal normalized by the normalization constant.

12. The distance information processing apparatus according to claim 6, wherein the determiner is further configured to normalize the distance image signal using a normalization constant calculated based on a width of the distance range and to determine the positional confidence as a magnitude of the differences among the plurality of positions in the normalized distance image signal.

13. The distance information processing apparatus according to claim 6, wherein the determiner is further configured to determine (a) that an area where a magnitude of the differences among the plurality of positions is larger than a threshold set based on the width of the distance range is an area with a low positional confidence, and (b) that an area where the magnitude of the differences among the plurality of positions is less than the threshold is an area with a high positional confidence.

14. The distance information processing apparatus according to claim 6, further comprising a corrector configured to generate a corrected distance image signal by correcting the distance image signal on the basis of the distance confidence and the positional confidence.

15. The distance information processing apparatus according to claim 14, wherein the corrector is further configured to generate the corrected image signal by applying a weighted smoothing filter to the distance image signal, wherein a weight of the weighted smoothing filter is larger as a synthetic confidence of the distance confidence and the positional confidence is larger.

16. The distance information processing apparatus according to claim 15, wherein the weight of the weighted smoothing filter is larger as a pixel distance is shorter.

17. The distance information processing apparatus according to claim 14, wherein the distance image signal is generated based on a first image signal and a second image signal,
   wherein the corrector is further configured to generate the corrected image signal by applying a weighted smoothing filter to the distance image signal, and
   wherein a weight of the weighted smoothing filter is larger as a synthetic confidence of the distance confidence and the positional confidence is larger, and the weight is larger as a color difference or a brightness difference of a synthesized image signal of the first image signal and the second image signal is smaller.

18. The distance information processing apparatus according to claim 6, further comprising:
   a storage unit; and
   a quantizing unit configured to (a) set a maximum value and a minimum value in a quantized distance range based on the distance range, (b) set a quantized distance value by dividing a range between the maximum value and the minimum value in the quantized distance range by a predetermined quantization rate, (c) calculate a quantized distance image signal by correlating the object distance constituting the distance image signal with a quantized distance value having a closest value, and (d) store the quantized distance image signal in the storage unit.

19. The distance information processing apparatus according to claim 1, wherein the acquirer is further configured to acquire the distance image signal based on a relative shift amount between a first image signal and a second image signal, the first image signal and the second image signal being relatively shifted by a positional shift amount according to the distances to the object.

20. The distance information processing apparatus according to claim 1, wherein the acquirer is further configured to acquire the distance image signal based on a relative shift amount between a first image signal and a second image signal, the first image signal and the second image signal being image signals consecutively photographed in a time series while changing imaging conditions, so as to have different characteristics in modulation transfer function, depending on the distance to the object.

21. An imaging apparatus comprising:
an imaging unit; and
the distance information processing apparatus according to claim 1.

22. The imaging apparatus according to claim 21, further comprising:
a light emitting unit; and
a light emission controller configured to calculate light emission control information to control a light emission quantity of the light emitting unit on the basis of a distance range calculated by the distance information processing apparatus, and to control the light emitting unit so that light is irradiated according to the light emission control information in synchronization with imaging by the imaging unit.

23. The imaging apparatus according to claim 22, wherein the light emission controller calculates the light emission control information so that the light emission quantity of the light emitting unit becomes higher as the object distance acquired based on the distance range is longer.

24. The imaging apparatus according to claim 23, wherein the light emission controller calculates the light emission control information so that the light emission quantity of the light emitting unit becomes higher in proportion to a square of the object distance acquired based on the distance range.

25. The imaging apparatus according to claim 21, further comprising:
a light emitting unit; and
a light emission controller configured to calculate light emission control information to control a light emission quantity distribution of the light emitting unit on the basis of a distance range calculated by the distance information processing apparatus, and to control the light emitting unit so that light is irradiated according to the light emission control information in synchronization with imaging by the imaging unit.

26. The imaging apparatus according to claim 25, wherein the light emission controller is configured to calculate the light emission control information in case where a difference between an upper limit value and a lower limit value of the distance range is greater than a threshold.

27. The imaging apparatus according to claim 25, wherein the light emission controller is configured to determine light emission amount according to the object distance and to reduce the light emission amount for an area where the object distance is outside the distance range.

28. The distance information processing apparatus according to claim 1, wherein the memory and the processor further function as a corrector configured to generate a corrected distance image signal by correcting the distance image signal on the basis of the positional confidence.

29. A distance information processing method comprising:
acquiring a distance image signal constituted by a plurality of distances to an object in a depth direction in regions of an image signal; and
determining positional confidence of the distances for the regions of the image signal based on differences among a plurality of positions in an in-plane direction perpendicular to the depth direction, the plurality of positions respectively corresponding to the plurality of distances in the depth direction, the positional confidence being determined based on at least one of (a) an object cyclicity which is calculated based on the image signal and (b) a brightness saturation degree which is calculated based on the image signal.

* * * * *